United States Patent
Humphreys et al.

(10) Patent No.: US 7,266,491 B2
(45) Date of Patent: Sep. 4, 2007

(54) STATISTICALLY DRIVEN SENTENCE REALIZING METHOD AND APPARATUS

(75) Inventors: Kevin W. Humphreys, Redmond, WA (US); David Neal Weise, Kirkland, WA (US); Michael V. Calcagno, Kirkland, WA (US)

(73) Assignee: Microsoft Corporation, Redmond, WA (US)

( * ) Notice: Subject to any disclaimer, the term of this patent is extended or adjusted under 35 U.S.C. 154(b) by 0 days.

(21) Appl. No.: 11/152,352

(22) Filed: Jun. 14, 2005

(65) Prior Publication Data
US 2005/0234705 A1    Oct. 20, 2005

Related U.S. Application Data

(63) Continuation of application No. 09/909,530, filed on Jul. 20, 2001, now Pat. No. 7,003,445.

(51) Int. Cl.
    *G06F 17/27*     (2006.01)
(52) U.S. Cl. ............................................. 704/4; 704/9
(58) Field of Classification Search .................. 704/4, 704/8, 9
See application file for complete search history.

(56) References Cited

U.S. PATENT DOCUMENTS

| 4,942,526 | A | * | 7/1990 | Okajima et al. | ............... | 704/10 |
|---|---|---|---|---|---|---|
| 5,418,717 | A | * | 5/1995 | Su et al. | ........................ | 704/9 |
| 5,495,413 | A | * | 2/1996 | Kutsumi et al. | ................ | 704/4 |
| 5,528,491 | A | * | 6/1996 | Kuno et al. | ..................... | 704/9 |
| 5,799,269 | A | * | 8/1998 | Schabes et al. | ................. | 704/9 |
| 5,937,385 | A | | 8/1999 | Zadrozny et al. | ........... | 704/257 |
| 5,966,691 | A | | 10/1999 | Kibre et al. | ................. | 704/260 |
| 6,108,619 | A | * | 8/2000 | Carter et al. | .................... | 704/9 |
| 6,169,972 | B1 | | 1/2001 | Kono et al. | ................. | 704/257 |
| 6,275,791 | B1 | * | 8/2001 | Weise | ............................ | 704/9 |
| 6,405,162 | B1 | * | 6/2002 | Segond et al. | ................. | 704/9 |
| 6,684,188 | B1 | | 1/2004 | Mitchell et al. | ............... | 705/3 |
| 6,745,161 | B1 | | 6/2004 | Arnold et al. | ................. | 704/7 |

OTHER PUBLICATIONS

Nicolov et al. Approximate Generation from Non-Hierarchical Representations, 1996, Proceedings of the 8th. International Workshop on Natural Language Generation, pp. 31-40. ☐☐*

(Continued)

*Primary Examiner*—Tālivaldis Ivars Šmits
*Assistant Examiner*—Thomas E. Shortledge
(74) *Attorney, Agent, or Firm*—John D. Veldhuis-Kroeze; Westman, Champlin & Kelly, P.A.

(57) ABSTRACT

A method of, and system for, generating a sentence from a semantic representation maps the semantic representation to an unordered set of syntactic nodes. Simplified generation grammar rules and statistical goodness measure values from a corresponding analysis grammar are then used to create a tree structure to order the syntactic nodes. The sentence is then generated from the tree structure. The generation grammar is a simplified (context free) version of a corresponding full (context sensitive) analysis grammar. In the generation grammar, conditions on each rule are ignored except those directly related to the semantic representation. The statistical goodness measure values, which are calculated through an analysis training phase in which a corpus of example sentences is processed using the full analysis grammar, are used to guide the generation choice to prefer substructures most commonly found in a particular syntactic/semantic context during analysis.

12 Claims, 18 Drawing Sheets

OTHER PUBLICATIONS

Varges et al. Instance-Based Natural Language Generation, Jun. 2001, Second meeting of the North American Chapter of the Association for Computational Linguistics on Language technologies 2001, pp. 1-8.*

Stuart M. Shieber, Gertjan van Noord, Robert C. Moore, Fernando C.N. Pereira. Semantic-head-driven generation. *Computational linguistics*, 16(1), pp. 30-42, Mar. 1990.

Günter Neumann, Gertjan van Noord. Reversibility and Self-Monitoring in Natural Language Generation. In: Tomek Strazalkowski (ed.) *Reversible Grammar in Natural Language Processing*, pp. 59-95. Kluwer Academic Publishers, 1994.

Irene Langkilde, Kevin Knight. Generation that Exploits Corpus-Based Statistical Knowledge. In: *Proceedings of the 36th Annual Meeting of the Associateion for Computational Linguistics and the 17th International Conference on Computational Linguistics* (COLING-ACL ''98), pp. 704-710, Montreal, Quebec Canada, Aug. 1998.

Srinivas Bangalore, Owen Rambow. Exploiting a Probabilistic Hierarchical Model for Generation. In: *Proceedings of the 18th International Conference on Computation Linguistics* (COLING 2000), Saarbrücken, Germany, Aug. 2000.

Zadrozny et al., W., "The Compactness of Construction Grammars", IBM Research Report RC 20003, pp. 1-10, May 15, 1995.

European Search Report from Application No. EP 02 01 6129.

Bangalore et al., S., "Corpus-Based Lexical Choice in Natural Language Generation", retrieved from the internet on Oct. 20, 2005 at http://www.research.att.com/{srini/Papers/Generation/acl2000.ps>, Oct. 2000.

Aikawa et al., T., "Multilingual Sentence Generation", retrieved from the internet Oct. 20, 2005 at http://acl.ldc.upenn.edu/W/W01/W01-0808.pdf>, Jan. 2001.

Langkilde, I., "Forest-Based Statistical Sentence Generation", retrieved from the internet on Oct. 20, 2005 at http://www.isi.edu/licensed-sw/halogen/rankalg.ps>, Apr. 29, 2000.

* cited by examiner

Parse Tree 590
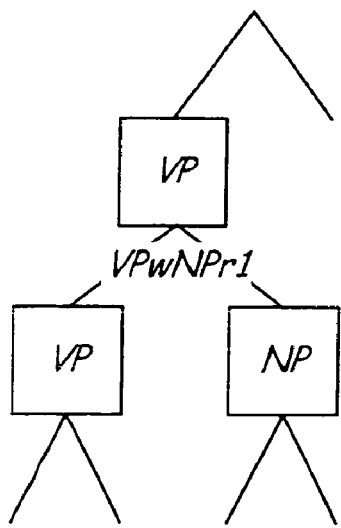
Parse Tree 592
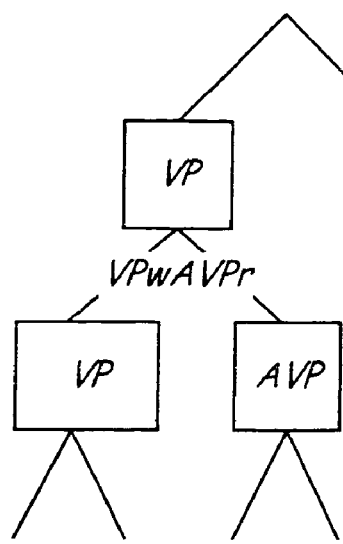
FIG. 15A
Parse Tree 594
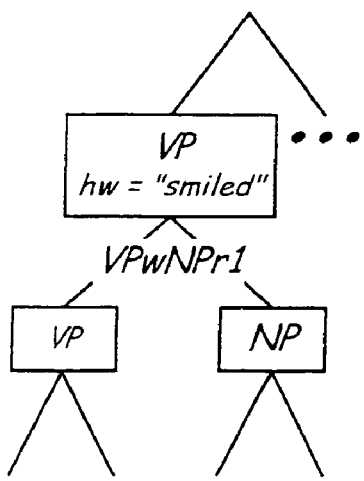
Parse Tree 596
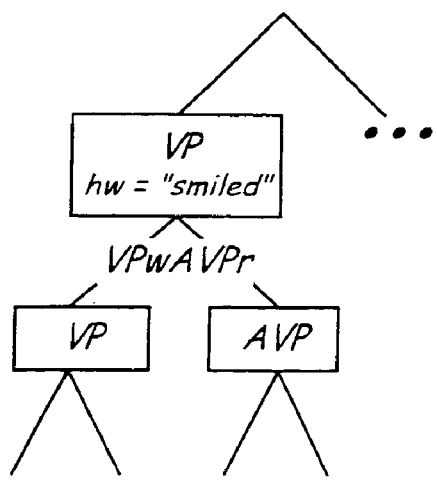
FIG. 15B

| Rule Name | Rule | | | Description (and an example) |
|---|---|---|---|---|
| VERBtoVP | VP | → | VERB | Promote a verb into a verb phrase |
| PredAdj | VP | → | VP AJP | Add on an adjective. "*It has been found effective*" |
| VPwNPr1 | VP | → | VP NP | Add direct object to a VP "*I hit Bill*" |
| Perfect | VP | → | VP VP | Adds the VP "have" to a VP "*Joe had gone*" |
| SubjQuant | VP | → | NP VP | Add quantifiers to the VP like "all", "both", ... "*The children have all gone*" |
| VPwNPl | VP | → | NP VP | Add noun subject to a VP "*John jumped*" |
| SubjectAJP | VP | → | AJP VP | Add AJP subject to a VP "*More surprising is his attitude*" |
| InvertAJPwS | VP | → | AJP VP | Add final modifier, AJP, to the left of a VP "*More remarkable still, he went*" |
| Topicalization | VP | → | NP VP | Add object of VP, NP, to the left of a VP "*A better-looking man I have not seen*" |

FIG. 16

| Phrase Level | Rule Name | Rule | | | Level Description |
|---|---|---|---|---|---|
| 1 | VERBtoVP | VP(1) → | VERB(PL_Verb_Max) | | Create a VP |
| 2 | PredAdj | VP(2) → | VP(1) | AJP(PL_AJP_Max) | Add post modifiers |
|   | VPwNPr1 | VP(2) → | VP(1) | NP(PL_AJP_Max) | |
|   | VPNull2 | VP(2) → | VP(1) | | |
| 3 | Perfect | VP(3) → | VP(1) | VP(2,3) | Add "have" and quantifiers |
|   | SubjPQuant | VP(3) → | NP(PL_NP_Max) | VP(2,3) | |
|   | VPNull3 | VP(3) → | VP(2) | | |
| 4 | VPwNP1 | VP(4) → | NP(PL_NP_Max) | VP(3) | Add subject |
|   | SubjectAJP | VP(4) → | AJP(PL_AJP_Max) | VP(3) | |
|   | VPNull4 | VP(4) → | VP(3) | | |
| 5 | InvertAJPwS | VP(5) → | AJP(PL_AJP_Max) | VP(4) | Add modifiers to VPs that have a subject |
|   | Topicalization | VP(5) → | NP(PL_NP_Max) | VP(4) | |
|   | VPNull5 | VP(5) → | VP(4) | | |

FIG. 18

STATISTICALLY DRIVEN SENTENCE REALIZING METHOD AND APPARATUS

The present application is a continuation of and claims priority of U.S. patent application Ser. No. 09/909,530, filed Jul. 20, 2001 now U.S. Pat. No. 7,003,445, the content of which is hereby incorporated by reference in its entirety.

BACKGROUND OF THE INVENTION

The present invention relates to natural language processing. More particularly, the present invention relates to the field of sentence realization in natural language generation.

Natural language processing can involve various different aspects, such as natural language processing and natural language generation. In-processing natural languages, such as English, Hebrew and Japanese, a parser is typically used to analyze sentences. To conduct the analysis, parsers utilize extensive analysis grammars developed for the task. Analysis grammars are sets of grammar rules which attempt to codify and interpret the actual grammar rules of a particular natural language, such as English.

A subtask of natural language generation is sentence realization: the process of generating a grammatically correct sentence from an abstract semantic/logical representation. Where an extensive grammar has been constructed for automatic natural language analysis, specifying the legal syntactic constructions of a language, it is desirable to use the same grammar specification when automatically producing sentences. However, wide coverage analysis grammars allow many syntactic variations of the same semantic representation, for example the alternative sentences "John ran quickly", "John quickly ran" and "Quickly, John ran" may all be assigned the same semantic representation, of the form:

run (+Past)
Actor: John
Manner: quickly

When generating sentences from such a representation using the same grammar, a single preferred form must be chosen, and in cases where the analysis grammar allows ungrammatical sentences to be processed (intentionally or not) these ungrammatical forms will be additional options in the grammar for generation and must be excluded. Also, the formalism used to represent an analysis grammar is typically chosen without considering generation, and converting an existing grammar to a form suitable for generation is often more difficult than writing a new generation-specific grammar. Where it is possible to automatically simplify the grammar to aid the conversion process, this will typically lead to an increase in the range of ungrammatical sentences allowed by the grammar (termed over-generation), which must again be excluded during generation.

SUMMARY OF THE INVENTION

The present invention includes a method of, and a system for, generating a sentence from a semantic representation. The semantic representation is mapped to an unordered set of syntactic nodes. Simplified generation grammar rules and statistical goodness measure values from a corresponding analysis grammar are then used to create a tree structure to order the syntactic nodes. The sentence is then generated from the tree structure. The generation grammar is a simplified (context free) version of a corresponding full (context sensitive) analysis grammar. In the generation grammar, conditions on each rule are ignored except those directly related to the semantic representation. The statistical goodness measure values, which are calculated through an analysis training phase in which a corpus of example sentences is processed using the full analysis grammar, guide the generation choice to prefer substructures most commonly found in a particular syntactic/semantic context during analysis.

BRIEF DESCRIPTION OF THE DRAWINGS

FIGS. 15A and 15B show fragments of two pairs of typical parse trees, respectively without and with headword annotation.

FIG. 16 is a table illustrating examples of rules which create a given node type and which are therefore grouped into levels in some embodiments of the invention.

FIG. 18 is a table illustrating rules associated with particular phrase levels in some embodiments of the invention.

DETAILED DESCRIPTION OF ILLUSTRATIVE EMBODIMENTS

Computing Environment

Figure 1:
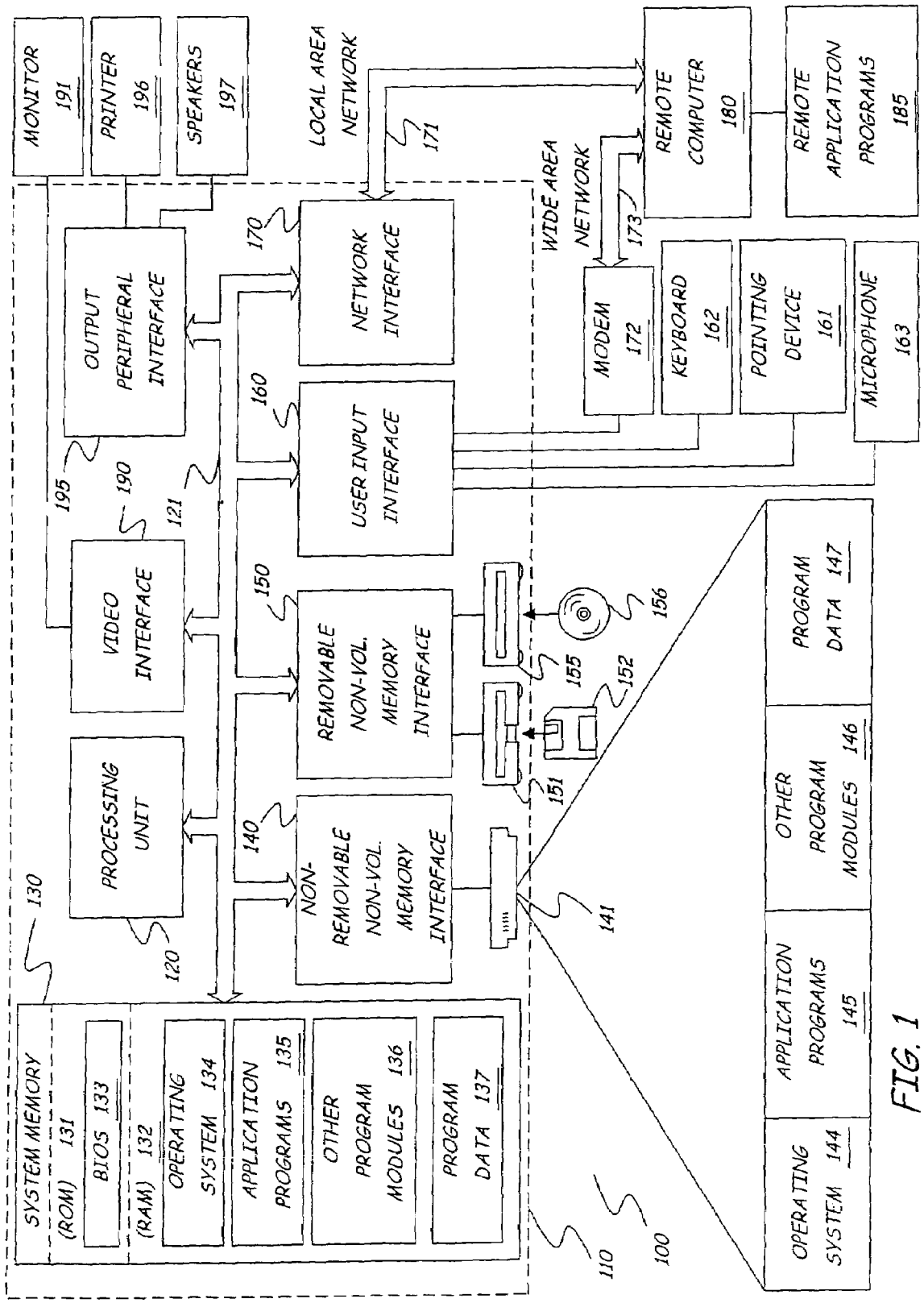
FIG. 1 is a block diagram of a general computing environment in which the present invention may be practiced.

FIG. 1 illustrates an example of a suitable computing system environment 100 on which the invention may be implemented. The computing system environment 100 is only one example of a suitable computing environment and is not intended to suggest any limitation as to the scope of use or functionality of the invention. Neither should the computing environment 100 be interpreted as having any dependency or requirement relating to any one or combination of components illustrated in the exemplary operating environment 100.

The invention is operational with numerous other general purpose or special purpose computing system environments or configurations. Examples of well known computing systems, environments, and/or configurations that may be suitable for use with the invention include, but are not limited to, personal computers, server computers, hand-held or laptop devices, multiprocessor systems, microprocessor-based systems, set top boxes, programmable consumer electronics, network PCs, minicomputers, mainframe computers, distributed computing environments that include any of the above systems or devices, and the like.

The invention may be described in the general context of computer-executable instructions, such as program modules, being executed by a computer. Generally, program modules include routines, programs, objects, components, data structures, etc. that perform particular tasks or implement particular abstract data types. The invention may also be practiced in distributed computing environments where tasks are performed by remote processing devices that are linked through a communications network. In a distributed computing environment, program modules may be located in both local and remote computer storage media including memory storage devices.

With reference to FIG. 1, an exemplary system for implementing the invention includes a general-purpose computing device in the form of a computer 110. Components of computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

Computer 110 typically includes a variety of computer readable media. Computer readable media can be any available media that can be accessed by computer 110 and includes both volatile and nonvolatile media, removable and non-removable media. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computer 100.

Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, FR, infrared and other wireless media. Combinations of any of the above should also be included within the scope of computer readable media.

Figure 5:
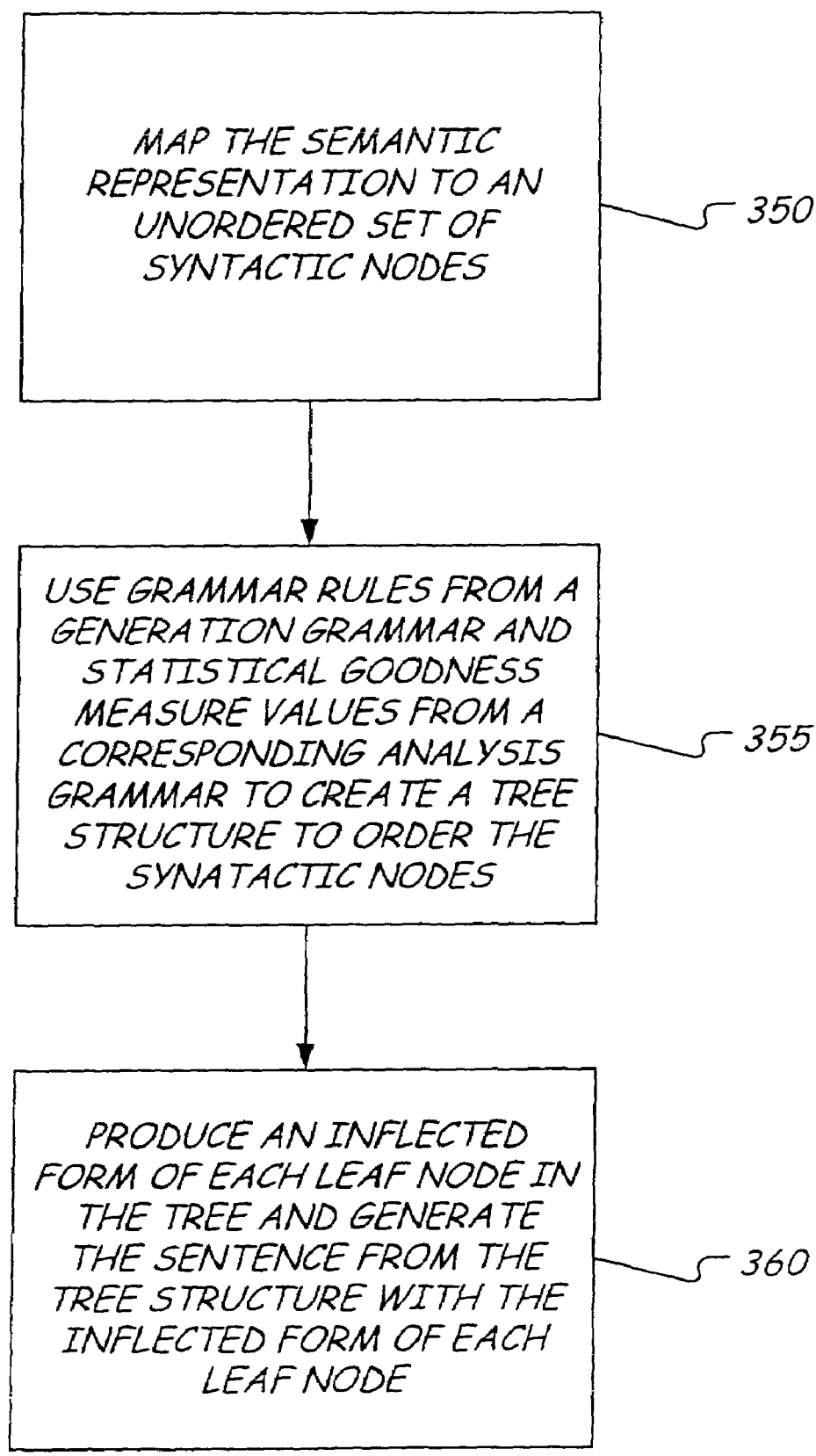
FIG. 5 is a flow diagram illustrating general methods of the present invention.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 5 illustrates operating system 134, application programs 135, other program modules 136, and program data 137.

The computer 110 may also include other removable/non-removable volatile/nonvolatile computer storage media. By way of example only, FIG. 5 illustrates a hard disk drive 141 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media discussed above and illustrated in FIG. 1, provide storage of computer readable instructions, data structures, program modules and other data for the computer 110. In FIG. 1, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers here to illustrate that, at a minimum, they are different copies.

A user may enter commands and information into the computer 110 through input devices such as a keyboard 162, a microphone 163, and a pointing device 161, such as a mouse, trackball or touch pad. Other input devices (not shown) may include a joystick, game pad, satellite dish, scanner, or the like. These and other input devices are often connected to the processing unit 120 through a user input interface 160 that is coupled to the system bus, but may be connected by other interface and bus structures, such as a parallel port, game port or a universal serial bus (USB). A monitor 191 or other type of display device is also connected to the system bus 121 via an interface, such as a video interface 190. In addition to the monitor, computers may also include other peripheral output devices such as speakers 197 and printer 196, which may be connected through an output peripheral interface 190.

The computer 110 may operate in a networked environment using logical connections to one or more remote computers, such as a remote computer 180. The remote computer 180 may be a personal computer, a hand-held device, a server, a router, a network PC, a peer device or other common network node, and typically includes many or all of the elements described above relative to the computer 110. The logical connections depicted in FIG. 5 include a local area network (LAN) 171 and a wide area network (WAN) 173, but may also include other networks. Such networking environments are commonplace in offices, enterprise-wide computer networks, intranets and the Internet.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user-input interface 160, or other appropriate mechanism. In a networked environment, program modules depicted relative to the computer 110, or portions thereof, may be stored in the remote memory storage device. By way of example, and not limitation, FIG. 1 illustrates remote application programs 185 as residing on remote computer 180. It will be appreciated that the network connections shown are exemplary and other means of establishing a communications link between the computers may be used.

Figure 2:
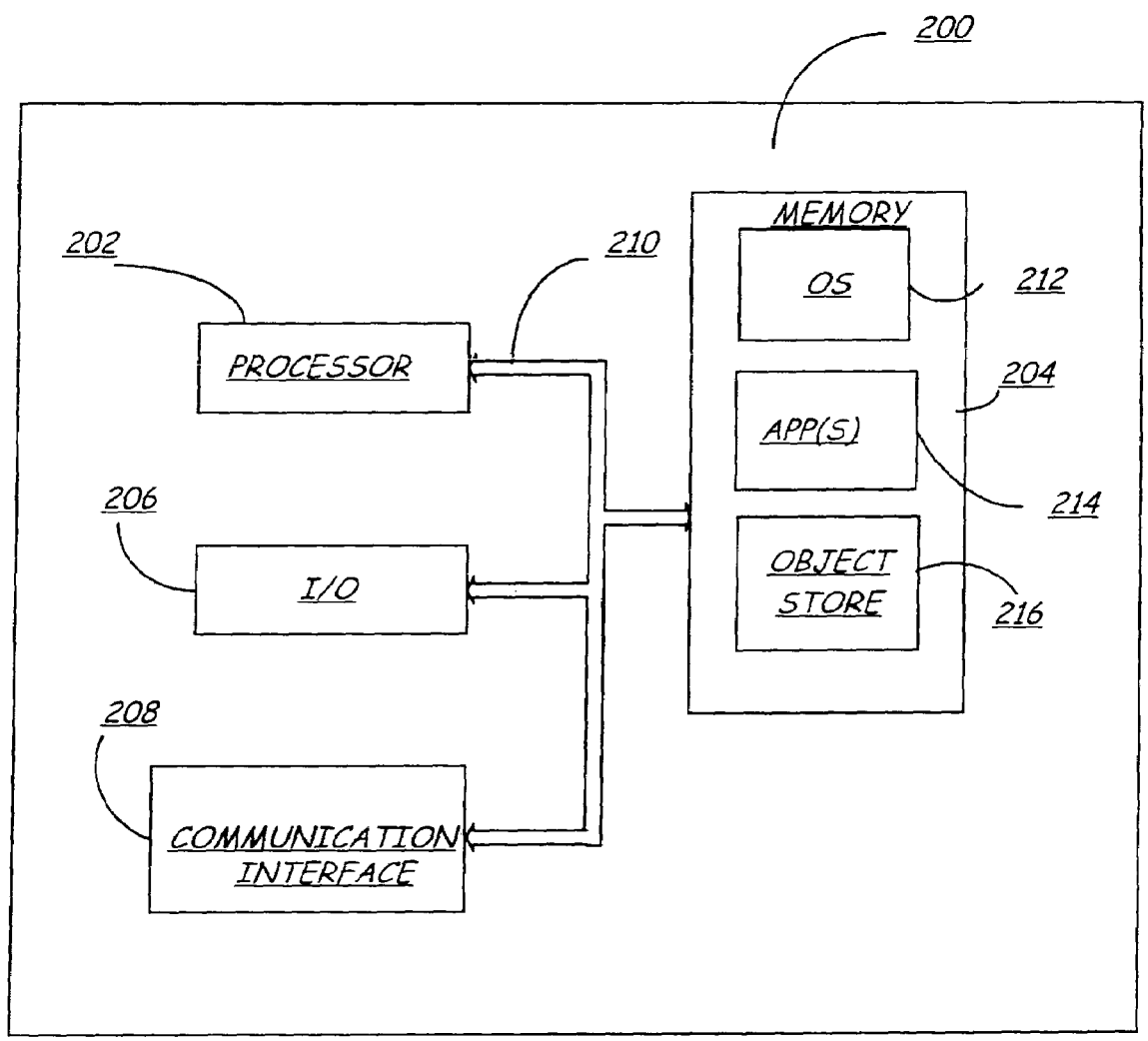
FIG. 2 is a block diagram of a mobile device in which the present invention may be practiced.

FIG. 2 is a block diagram of a mobile device 200, which is an exemplary computing environment. Mobile device 200 includes a microprocessor 202, memory 204, input/output (I/O) components 206, and a communication interface 208 for communicating with remote computers or other mobile devices. In one embodiment, the aforementioned components are coupled for communication with one another over a suitable bus 210.

Memory 204 is implemented as non-volatile electronic memory such as random access memory (RAM) with a battery back-up module (not shown) such that information stored in memory 204 is not lost when the general power to mobile device 200 is shut down. A portion of memory 204 is preferably allocated as addressable memory for program execution, while another portion of memory 204 is preferably used for storage, such as to simulate storage on a disk drive.

Memory 204 includes an operating system 212, application programs 214 as well as an object store 216. During operation, processor 202 from memory 204 preferably executes operating system 212. Operating system 212, in one preferred embodiment, is a WINDOWS® CE brand operating system commercially available from Microsoft Corporation. Operating system 212 is preferably designed for mobile devices, and implements database features that can be utilized by applications 214 through a set of exposed application programming interfaces and methods. The objects in object store 216 are maintained by applications 214 and operating system 212, at least partially in response to calls to the exposed application programming interfaces and methods.

Communication interface 208 represents numerous devices and technologies that allow mobile device 200 to send and receive information. The devices include wired and wireless modems, satellite receivers and broadcast tuners to name a few. Mobile device 200 can also be directly connected to a computer to exchange data therewith. In such cases, communication interface 208 can be an infrared transceiver or a serial or parallel communication connection, all of which are capable of transmitting streaming information.

Input/output components 206 include a variety of input devices such as a touch-sensitive screen, buttons, rollers, and a microphone as well as a variety of output devices including an audio generator, a vibrating device, and a display. The devices listed above are by way of example and need not all be present on mobile device 200. In addition, other input/output devices may be attached to or found with mobile device 200 within the scope of the present invention.

System and Method

Figure 3:
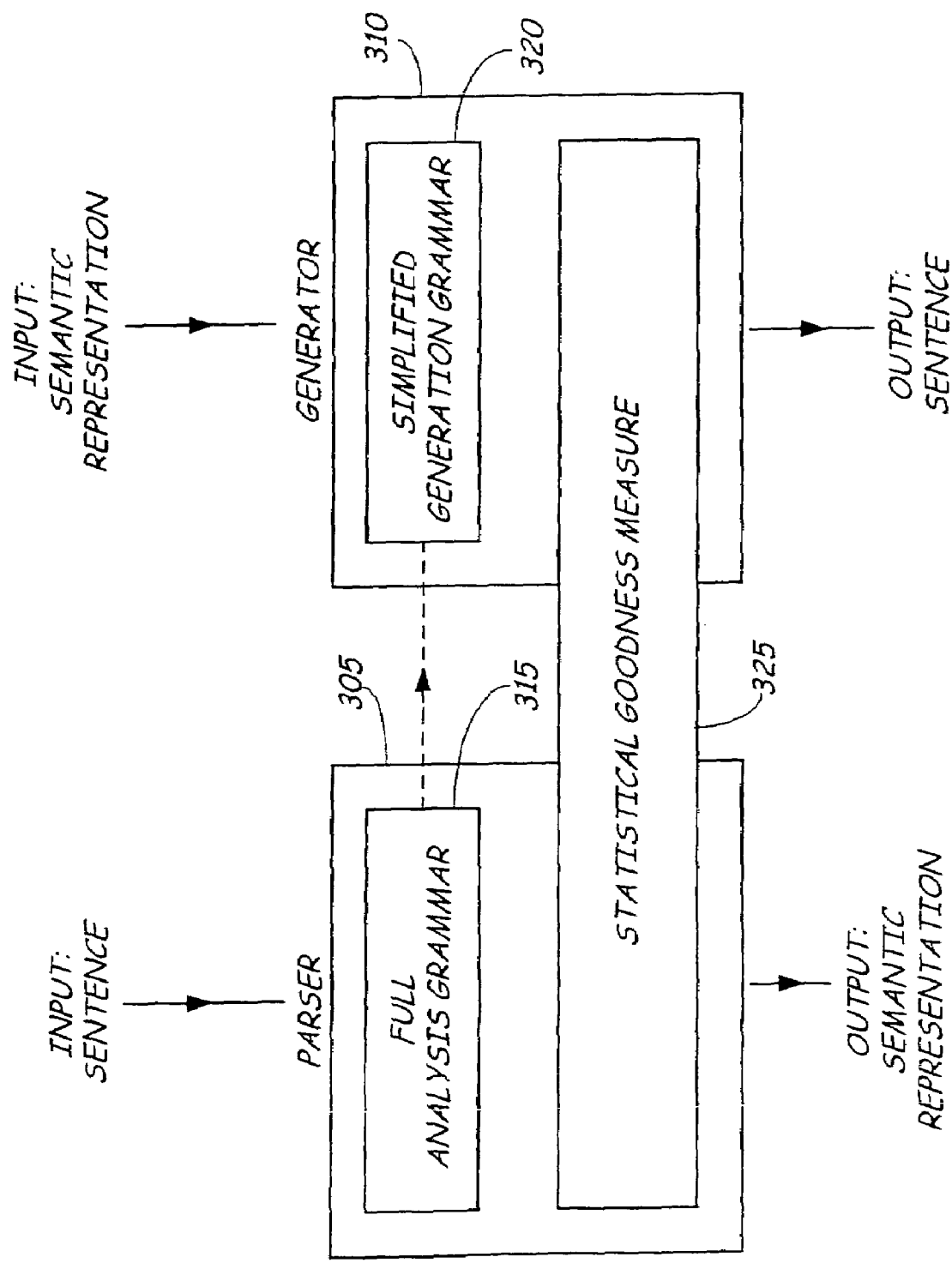
FIG. 3 is a system diagram illustrating the sentence generation system of the present invention.
Figure 4:
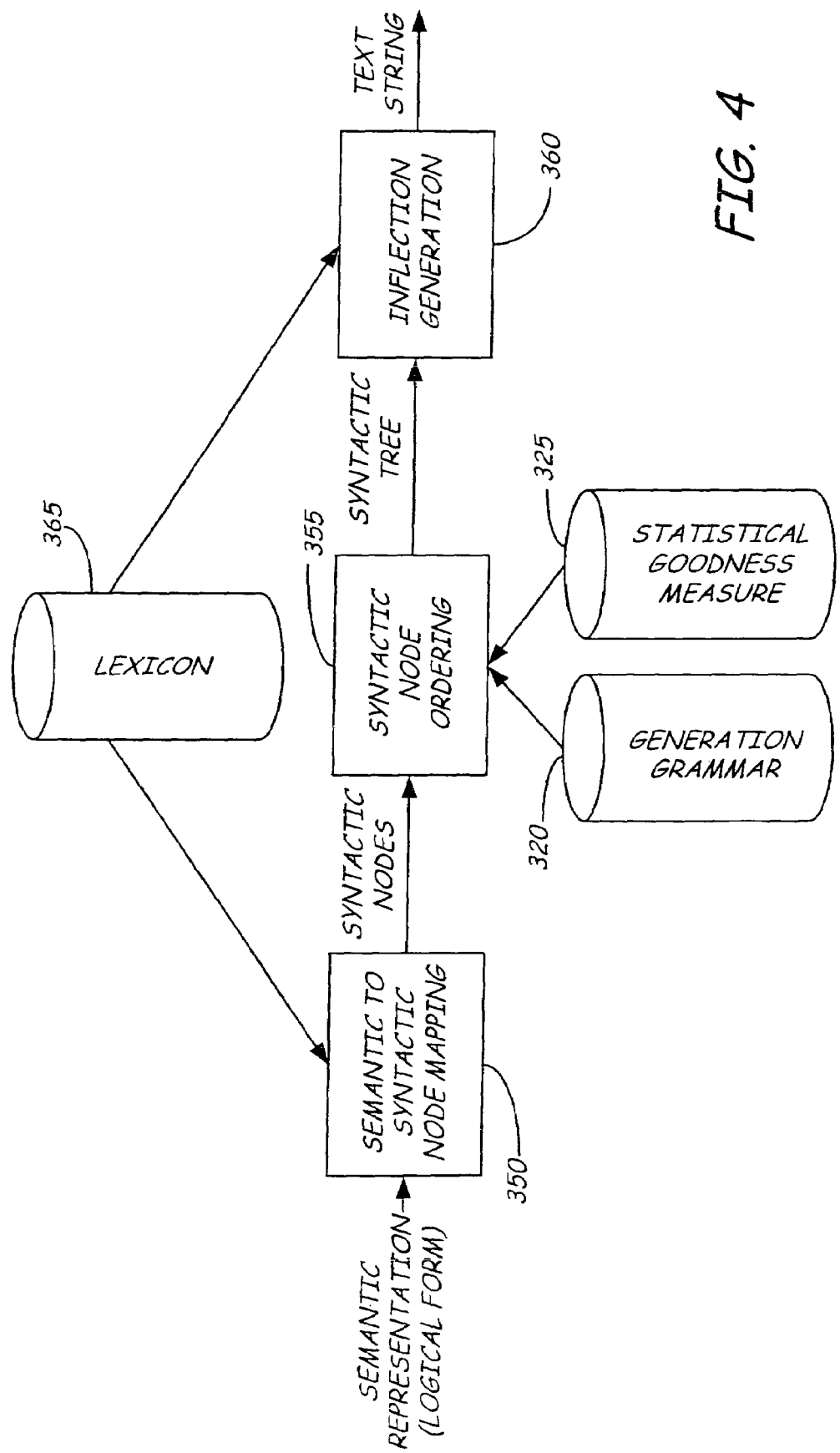
FIG. 4 is a diagrammatic illustration of the sentence generation process implemented by the system shown in FIG. 3.

FIG. 3 is a system diagram which can be implemented in a computing environment such as computer 110 or mobile device 200. FIG. 4 is a diagrammatic illustration of a sentence generation process of the invention. FIG. 5 is a flow diagram illustrating general methods of the invention shown.

Shown in FIG. 3 is a sentence generator or realizer 310. Sentence generator 310 receives as an input a semantic representation. Using a simplified generation grammar 320 and a statistical goodness measure (SGM) 325, generator 310 produces an output sentence which has a high probability of being grammatically correct. The simplified generation grammar 320 is a simplified version of the full analysis grammar 315 used by a parser 305 when analyzing natural language. The SGM 325 is used by both the generator 310 and the parser 305. Parser 305 of a natural language analyzing system is shown in FIG. 3 to illustrate the relationships between generation grammar 310 and analysis grammar 315, and to illustrate the shared SGM (or SGM database) 325. Inclusion of parser 305 in FIG. 3 is not intended to imply that the parser is part of the natural language generating system which includes sentence generator 310.

In the methods and systems disclosed herein, sentence generation is carried out using a simplified (context free) version 320 of a grammar, combined with an SGM 325 from the full (context sensitive) version 315 of the same grammar. The SGM is a measure of the probability of syntactic substructures derived from the syntactic/semantic analysis of a corpus with the full grammar 315, and used to guide subsequent analysis. When generating a syntactic structure for a sentence, at each choice point in the simplified generation grammar, the SGM is used to guide the generation choice to prefer the substructure most commonly found in a particular syntactic/semantic context during analysis. A detailed discussion of one SGM technique is described later with reference to FIGS. 15A-21.

As noted previously, producing a generation grammar is a difficult task, and conversion of analysis grammars into a generation grammar is a complex task due to the large number of conditions which govern the application of specific rules. The solution proposed here is to convert an analysis grammar for generation, and then use an independently motivated SGM, computed automatically during the syntactic analysis of a corpus and used to improve subsequent analyses, to guide the choice of syntactic construction type during sentence generation. Reference to the SGM values will indicate a preferred construction in every case and so avoid the generation of ungrammatical forms which may be allowed by the grammar. This therefore allows the use of a simplified form of the analysis grammar for generation, because the increased over-generation can be constrained by the SGM.

A key feature of the design is the sharing of a single SGM (or SGM database) 325 for both analysis and generation. The SGM 325 is calculated through an analysis training phase, processing a corpus of example sentences using the full analysis grammar, and recording frequency counts of syntactic substructures in particular contexts, including word collocations and dependencies in syntactic and/or semantic relationships. After training, the SGM is used in normal analysis to direct the parser to prefer more probable structures, and in generation to guide rule selection.

Grammar Conversion

Techniques for using a single grammar for both analysis and generation exist in research literature ("reversible" or "bidirectional" grammars), but place strong restrictions on the formalism in which the grammar is represented. In the present invention the conversion is of a large well-established analysis-specific grammar 315, developed independently of generation requirements. The full analysis grammar 315 includes extensive lists of conditions on each grammar rule, many of which are either irrelevant for generation or cannot be automatically converted. The approach here is to produce only a simple context free grammar for generation, ignoring all conditions from the analysis grammar except those directly related to the semantic representation.

Figure 6:
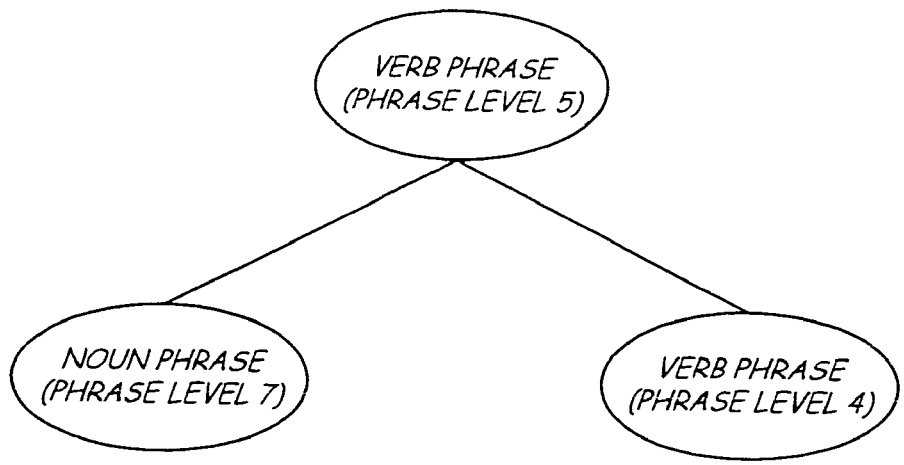
FIG. 6 is a syntactic tree structure for the grammar rule VPwNP1 (verb phrase with noun phrase on the left).

For example, the rule VPwNPl (verb phrase with noun phrase on the left) describes the syntactic tree structure shown in FIG. 6. PhraseLevel is an attribute used to partition the grammar into sets of rules that apply to nodes at different levels of a syntactic tree structure, primarily to constrain the search space through the grammar. The rule is of the form VP(5)→NP(7) VP(4), which, in analysis, is read as "a noun phrase (level 7) followed by a verb phrase (level 4) can be combined to produce a new verb phrase (level 5)". However, besides the PhraseLevel tests in this grammar rule, there are nearly 3000 lines of code expressing further conditions on when the rule can apply, testing syntactic features of the nodes and their neighbors (i.e. the rule is context sensitive). These conditions are always tested during analysis, and therefore during training for the SGM 325, so that the SGM values effectively capture the effects of the conditions (a "condition memory").

From the generation perspective, the VPwNPl rule is read as "a verb phrase (level 5) can be expanded into a noun phrase (level 7) followed by a verb phrase (level 4)". All the detailed conditions of the analysis rule can be ignored, apart from the PhraseLevel and any syntactic role of the nodes that is directly related to the semantic representation. For this rule, the noun phrase is assigned the role of Subject in analysis, so that in generation the verb phrase at level 5 must have a Subject attribute (the rule's condition for use in generation) and the verb phrase at level 4, after expansion, does not.

Simplifying the grammar for generation, by ignoring almost all of the analysis conditions, will mean that several rules may now apply to a particular node, where only one would apply if the conditions were tested. The grammar without conditions will therefore greatly over-generate—a term meaning that an analysis grammar will accept, or a generation grammar will produce, many ungrammatical sentences that should be excluded. The simplified grammar 320 alone is therefore inadequate for generation, but by adding reference to the SGM 325, the effects of the analysis grammar's detailed conditions are implicitly retained (the "condition memory"). The SGM indicates preferred grammar rules to apply to a particular node, given the features and context of the node, so that a selection can be made in generation without needing to convert and test all the conditions from the analysis grammar.

Generation Stages

Referring back to FIG. 4, shown is a diagram illustrating the stages of the generation process implemented by generator 310 (FIG. 3) in the context of a system. FIG. 5 is a flow diagram illustrating the general method steps. The overall generation process operates in three distinct stages:

1. the semantic representation (a logical form, representing predicates and semantic relation types) is mapped (step shown at block 350 in FIG. 4) to an unordered set of syntactic nodes with the aid of a lexicon 365;
2. generation grammar rules (from grammar 320) are used to create a tree structure to order the nodes and insert any additional syntactically required nodes (step shown at block 355); and
3. an inflected form of each leaf node in the tree is produced (e.g. "ran" from "run"+past tense) with the aid of the lexicon as shown at block 360, and a text string read off from the tree.

The second stage makes use of the technique proposed here to integrate the SGM 325 from the analysis grammar 315 with the use of the generation grammar 320. The following describes the algorithm for this stage and then steps through a worked example.

Generation Algorithm:

Generating a Single Preferred Tree.

Figure 7:
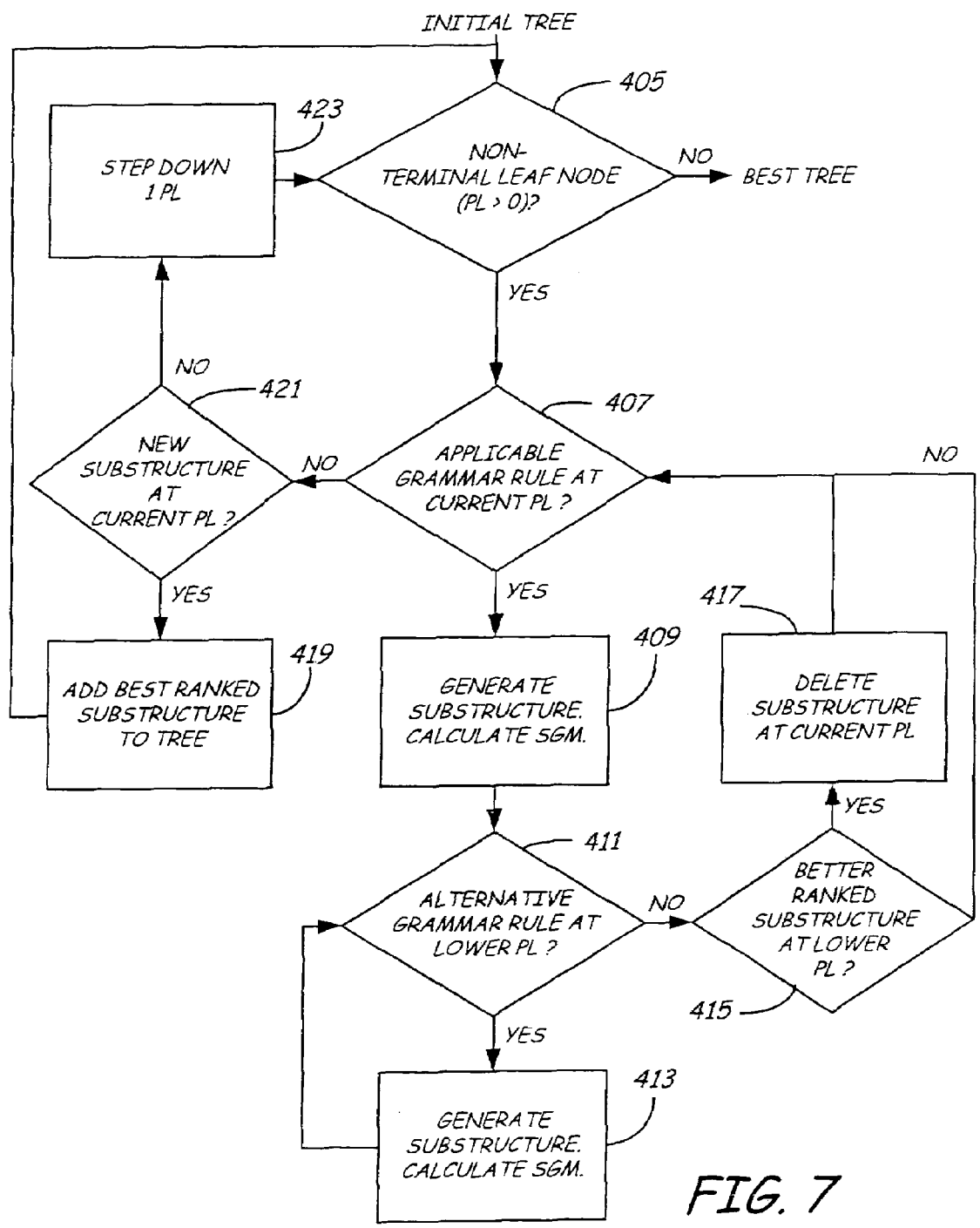
FIG. 7 is a flow diagram illustrating aspects of the methods of the invention in greater detail.

FIG. 7 is a block diagram illustrating a method or algorithm for syntactic node ordering (step 355 shown in FIG. 4). After each unit in the input semantic representation is mapped into a corresponding syntactic node:

1. Make the syntactic node of the top unit the root node of the new syntactic tree.
2. For each non-terminal leaf node (phrase level>0) in the tree as determined at step 405:
   a. For each generation grammar rule that applies to the selected node at the current phrase level as identified at step 407, test conditions on the semantically-derived attributes (e.g. Subject) by:
      i. Generating the syntactic substructure described by the rule (shown at 409).
      ii. Determining the SGM value for the substructure (also shown at 409).
      iii. For each generation grammar rule that applies to the selected node at a lower phrase level as identified at step 411, which expresses the same semantic attributes as the rule at the current phrase level:
         1. Generate the syntactic substructure described by the rule (shown at 413).
         2. Determine the SGM value for the substructure (also shown at 413).
      iv. If a substructure generated at a lower phrase level has a higher SGM value than the substructure generated at the current phrase level as determined at step 415, discard the substructure at the current phrase level as shown at step 417.
   b. Add the substructure generated at the current phrase level with the highest SGM value to the current syntactic tree (step 419). If no substructures exist at the current level (no applicable rules or all discarded) as determined at step 421, step down one phrase level (step 423).
   c. Repeat from 2.

In step 405 (step 2. described above), finding the next non-terminal node to expand, can be done using several search strategies. One implementation effectively uses a "head-driven" strategy, by first selecting the most recently generated node of the same type as its parent, before selecting other node types. However, since all attributes of all nodes are available in the input, and no additional nodes with attributes are introduced within the grammar, the order of expansion chosen by a particular search strategy will not exclude any possible paths and so will give the same result.

Steps 411 and 413 (step 2.a.iii. described above) can be viewed as calculating a "syntactic future" for the expression of a particular semantic attribute, to decide whether the attribute should be expressed now, at the current phrase level, or later, at a lower phrase level. The term reflects the "syntactic history" used as a measure of context in the SGM.

Example Generation

Given an input semantic representation of the form:
run (+Past)
Actor: John
Manner: quickly the first generation stage will map each unit of this representation to a syntactic node, translating features and relations from the semantic representation, and referring to the lexicon for further features and for certain node types:

run→verb phrase (VP) node, because of its position as a root semantic node with an attribute of type Actor, with features such as intransitive verb from the lexicon, and past tense from the semantic representation. The phrase level is set at the maximum for the VP node type.

John→noun phrase (NP) node, linked to the VP node by a Subject relation. The syntactic node and relation types are determined from the Actor relation in the semantic representation, and the syntactic node type to which it is related (the newly created VP), and from checking the lexicon for features such as +Number which constrain the types. The phrase level is set at the maximum for the NP node type.

quickly→adverbial phrase (AVP) node, linked to the VP node by a Modifier relation. The syntactic node and relation types are determined from the Manner relation in the semantic representation, the syntactic node type to which it is related (the VP), and from features in the lexicon. The phrase level is set at the maximum for the AVP node type.

This unordered set of three nodes is then passed to the next generation stage to be expanded into a full syntactic tree. The VP node is made the root node of the new tree, because it corresponds to the top level unit of the semantic representation.

Pass 1. The first step is to search the tree for a leaf node not at phrase level 0, which will return the VP node, since that is the only node present. The set of applicable grammar rules for the VP node at the maximum phrase level contains the Sentence rule only. Generating the substructure described by the Sentence rule acts to add a sentence final period and move the VP node down one phrase level, resulting in the syntactic substructure shown in FIG. 8.

Figure 8:
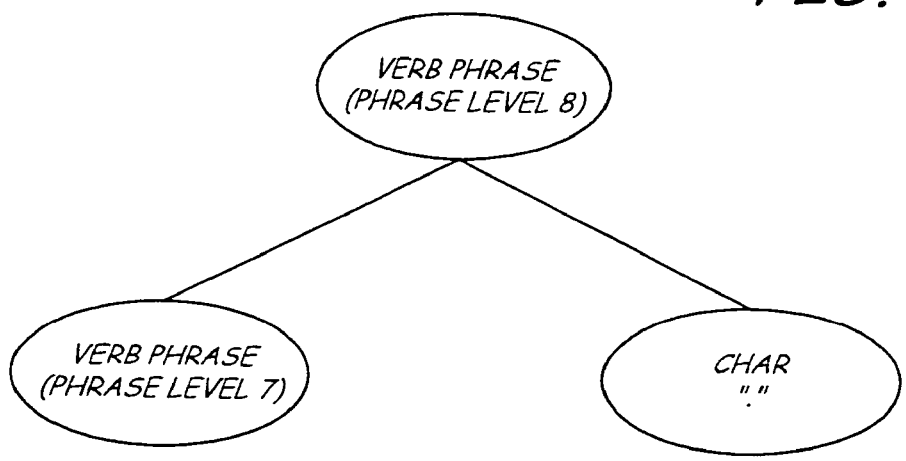
FIGS. 8-13 are syntactic tree structures illustrating various stages of the method shown in FIG. 7 for an example semantic representation.

The SGM value (0.009) for this substructure is checked from the SGM database 325. A copy of the original VP node is then taken and all applicable rules, expressing the same semantic content (in this case none), at each lower phrase level are searched for (the "syntactic future"). None are found and the substructure shown in FIG. 8 is added to the tree.

Pass 2. Again, search the tree for a leaf node above phrase level 0, returning the newly created VP node at level 7. Check for applicable grammar rules for the VP node, returning only SwAVPl (sentence with adverbial phrase on the left) where the semantic condition of this rule requires a Modifier of type AVP. Generate the substructure from this rule (AVP(quickly)+VP(run)) and find its SGM value (0.073) Step down each phrase level from the level 7 VP node and check for other applicable grammar rules expressing the same Modifier:

VPwAVP1 (verb phrase with adverbial phrase on the left) applies at phrase level 4—generate its substructure and find the SGM value (0.061).

VPwAVPr (verb phrase with adverbial phrase on the right) applies at phrase level 3—generate its substructure and find the SGM value (0.087).

VPwAVPr, at a lower phrase level, has a higher SGM value than the top level SwAVPl rule. Therefore, ignore the rule at the top phrase level, discard the substructure generated from it, and step down one phrase level.

Figure 9:
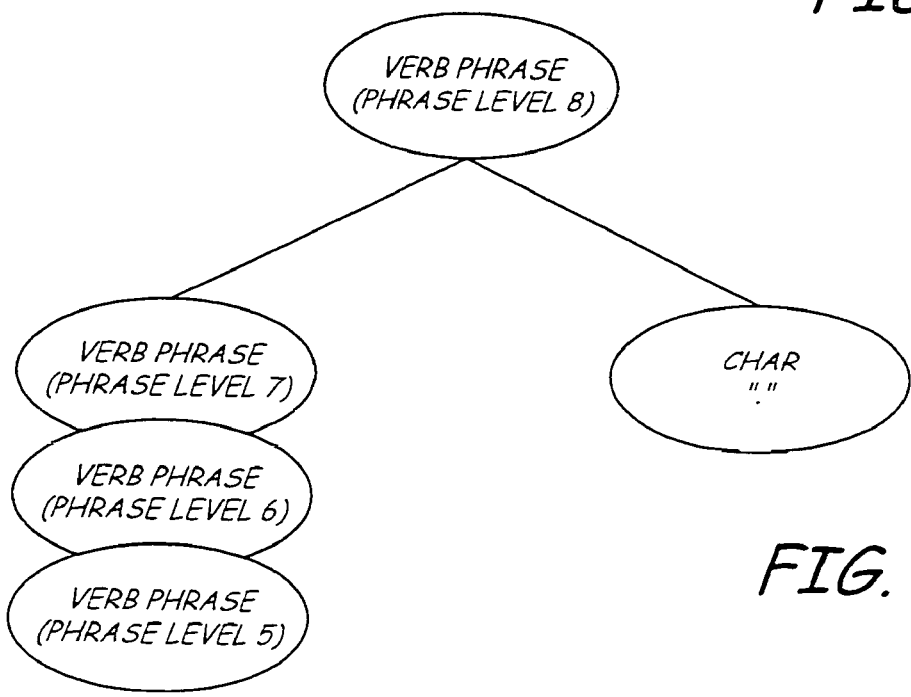

Pass 3. Search the tree for the next leaf node, returning the VP at its new phrase level 6. No grammar rules apply at this phrase level, so step down another level. The overall syntactic tree at this point is now as shown in FIG. 9.

Figure 10:
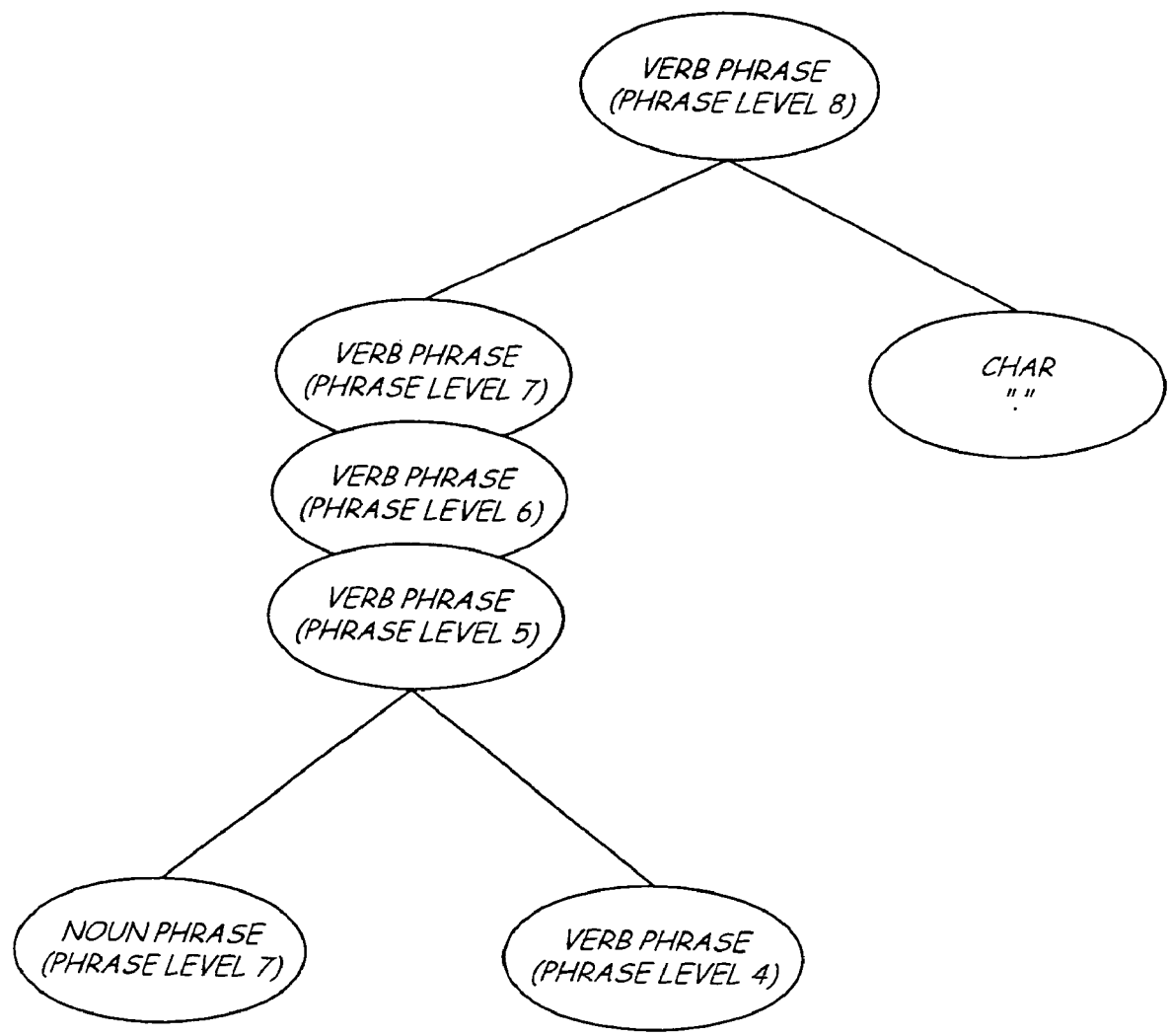

Pass 4. Search the tree for the next leaf node, returning the VP at level 5. Check for applicable grammar rules, returning VPwNPl. (verb phrase with noun phrase on the left) where the rule condition requires a Subject of type NP. Generate the substructure from this rule (NP(John)+VP(run)) and find its SGM value (0.914). Step down the phrase levels from the level 5 VP and check for other applicable rules expressing the same NP Subject attribute. None are found so the substructure is kept and added to the tree resulting in the overall syntactic tree shown in FIG. 10.

Pass 5. Search the tree for the next leaf node, returning the VP at the new phrase level 4. Check for applicable grammar rules, returning VPwAVPl, where the rule condition requires a Modifier of type AVP. Generate the substructure from this rule (AVP(quickly)+VP(run)) and find its SGM value (0.061). Step down the phrase levels from the level 4 VP and check for other applicable rules expressing the same AVP Modifier:

VPwAVPr applies at phrase level 3—generate its substructure and find the SGM value (0.087).

The rule at the lower phrase level has a higher SGM value, so ignore the top level rule, discard the generated substructure and step down one phrase level.

Pass 6. Search the tree for the next leaf node, returning the VP at the new phrase level 3. Check for applicable grammar rules, returning VPwAVPr where the rule condition requires a Modifier of type AVP. Generate the substructure from this rule (VP(run)+AVP(quickly)) and find its SGM value (0.087). This repeats the rule check and substructure generation from Pass 5, and so an extension to the algorithm would be to record substructures at lower levels for potential reuse.

Figure 11:
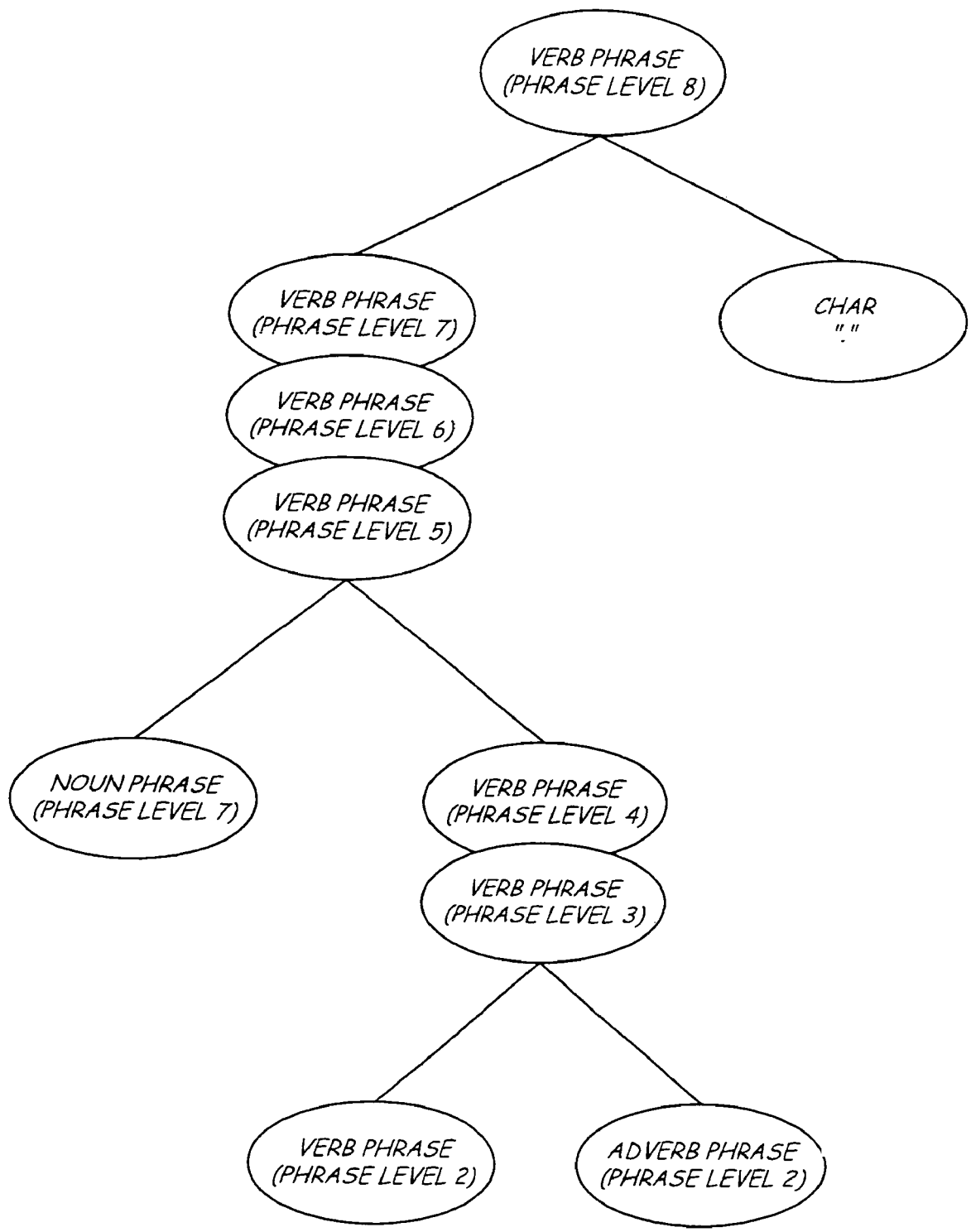

Step down the phrase levels from the level 3 VP and check for other applicable rules expressing the same Modifier. None are found so the substructure is kept and added to the tree resulting at this point in the overall syntactic tree shown in FIG. 11.

Pass 7. Search the tree for the next leaf node, returning the VP at phrase level 2. No grammar rules apply at this level, so step down one phrase level.

Figure 12:

Pass 8. The next leaf node is the VP at phrase level 1. The Verb as VP rule applies to this node, so generate its substructure and find the SGM value (1.000). There are no further phrase levels to check for alternative rules, so add the substructure to the tree resulting at this point in the overall syntactic tree shown in FIG. 12.

Pass 9. Search the tree for the next leaf node, returning the AVP at phrase level 2. No grammar rules apply at this level, so step down one phrase level.

Pass 10. The next leaf node is the AVP at phrase level 1. The Adverb as AVP rule and Pronoun as AVP rule both apply at this phrase level. Generate the substructures and find the SGM values for each (0.997 and 0.010 respectively). There are no further phrase levels to check for alternative rules, so add the substructure with the highest value (the Adverb) to the tree.

Pass 11. Search the tree for the next leaf node, returning the NP at phrase level 7. No grammar rules apply at this level, so step down one phrase level.

Passes 12 to 16. Step down the phrase levels of the NP node from 6 to 2. No grammar rules apply at any of these levels, so step down another phrase level each time.

Figure 13:
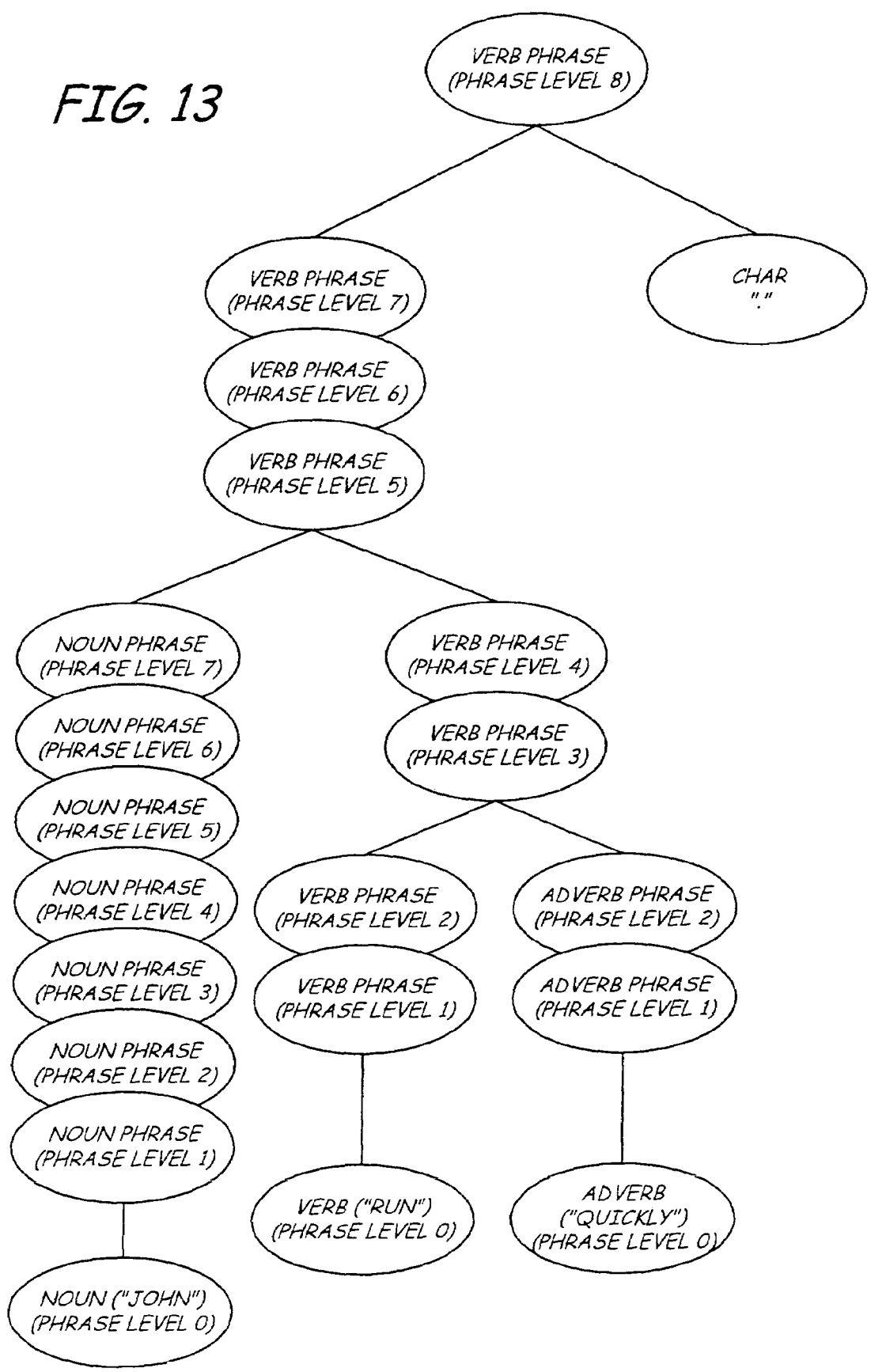

Pass 17. The final leaf node is the NP at phrase level 1. The Noun as NP rule and Adjective as NP rule both apply at this phrase level. Generate the substructures and find the SGM values for each (0.969 and 0.001 respectively). There are no further phrase levels to check for alternative rules, so add the substructure with the highest value (the Noun) to the tree, resulting in the structure shown in FIG. 13.

Pass 18. No leaf nodes with phrase level>0 found, so end.

The final generation stage (step 360 shown in FIG. 4) is to produce inflected forms of each leaf node, using features such as tense and number on the nodes, in this example only modifying "run" to "ran". Then, the tokens are read off from left to right to give the sentence: "John ran quickly."

Alternative Generation Algorithm: Generate All Possible Trees

One variation on the above algorithm is a mechanism to produce a ranked list of possible output sentences, not just a single preferred choice, by "backtracking" through the tree construction process to produce multiple trees from a single input, each with separate overall SGM values. This method is illustrated in the flow diagram of FIG. 14.

Figure 14:
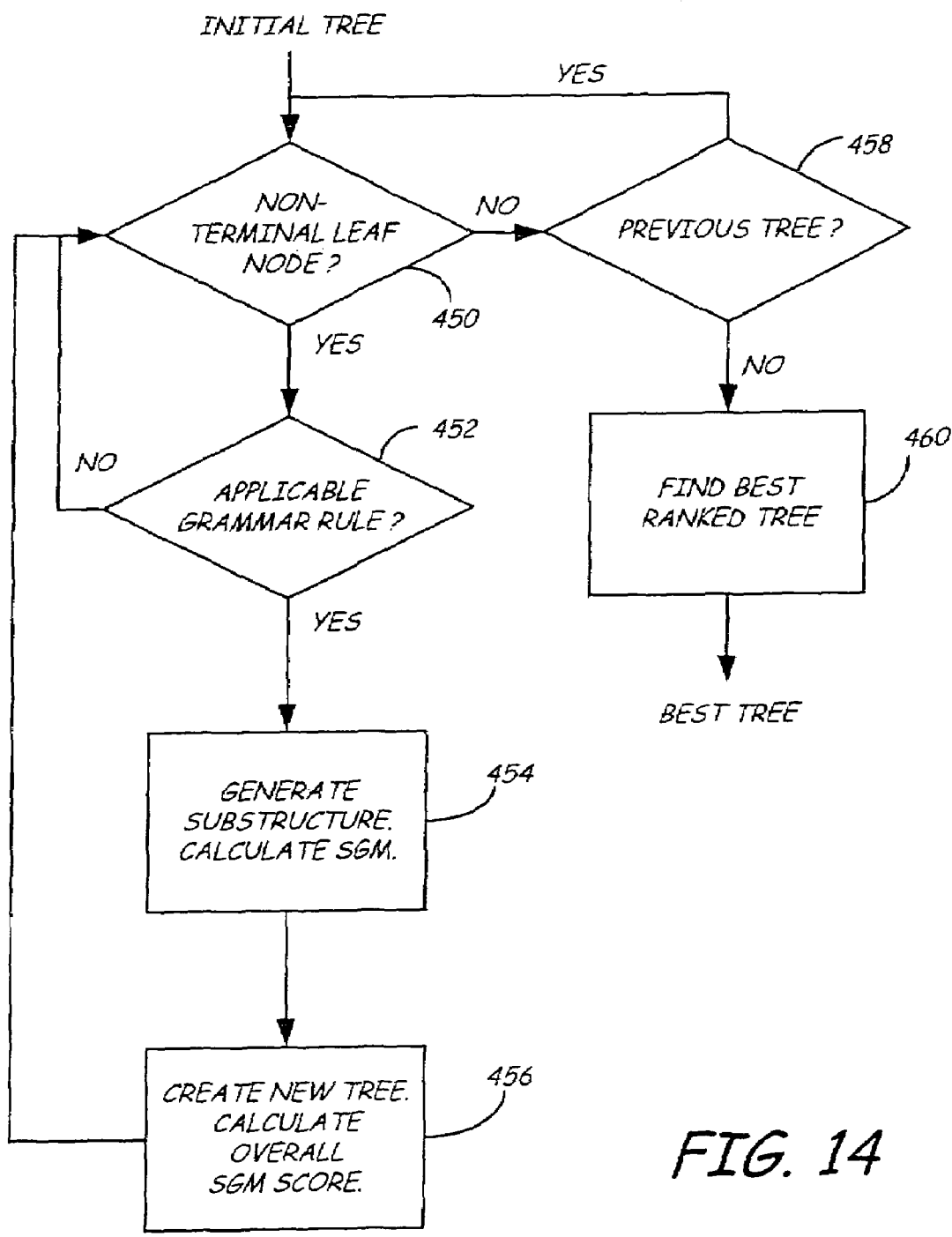
FIG. 14 is a flow diagram illustrating aspects of alternate methods of the invention.

Referring to FIG. 14, after each unit in the input semantic representation is mapped into a corresponding syntactic node:
1. Make the syntactic node of the top unit the root node of the new syntactic tree.
2. For each non-terminal leaf node in the tree as determined at step 450:
   a. For each generation grammar rule that applies to the selected node as identified at step 452, test conditions on the semantically-derived attributes (e.g. Subject):
      i. Generate the syntactic substructure described by the rule (shown at 454).
      ii. Determine the SGM value for the substructure (also shown at 454).
      iii. Create a new tree by adding the substructure to a copy of the current tree (shown at 456).
      iv. Add the SGM value to a total score for the tree (also shown at 456).
      v. Repeat from 2 with the new tree (determination of whether a new tree has been formed shown at 458).
3. Select the highest scoring tree as shown at 460.

Statistical Goodness Measure

As discussed above, the SGM used with the simplified generation grammar is the same SGM used in the corresponding full analysis system. Therefore, the following discussion of the SGM is in the context of the parser 305 (FIG. 3) which uses the SGM and the full analysis grammar. The exemplary SGM of the parser 305 uses a generative grammar approach. In a generative grammar approach, each sentence has a top-down derivation consisting of a sequence of rule applications (i.e., transitions). The probability of the parse tree is the product of the probabilities of all the nodes. The probability for a given node is the probability that from the node one would take a specific transition, given the syntactive features. The exemplary SGM of the parser may be calculated using either of the following equivalent formulas:

$$Prob(\text{parse}) + \Pi_X Prob(trn(n_X), hw(n_Y),\\ pl(n_Y), sh(n_Y), hw(n_Z), pl(n_Z),\\ sh(n_Z) \mid hw(n_X), pl(n_X), sh(n_X), segtype(n_X))$$ Formula A

OR...

$$Prob(\text{parse}) + \Pi_X Prob(trn(n_X) \mid hw(n_X),\\ pl(n_X), sh(n_X), segtype(n_X)) \, Prob(modhw(n_X) \mid\\ trn(n_X), hw(n_X))$$ Formula B where
$n_X$: is the $X^{th}$ node in a parse tree
$n_Y$ & $n_Z$: are the $Y^{th}$ and $Z^{th}$ nodes and children of the $X^{th}$ node
trn ($n_X$): is the name of the transition out of $n_X$ of the form X→Y Z
hw($n_X$): is the headword of $n_X$
pl($n_X$): is the phrase level of $n_X$
sl($n_X$): is the syntactic history of $n_X$
segtype($n_X$): is the segtype of $n_X$
modhw($n_X$): is the modifying headword of $n_X$ The parser defines phrase levels and labels them. Previous conventional approaches clustered transitions by segtype. For example, transitions focused on noun phrases, transitions focused verb phrases, etc. However, within each such grouping, the rules can be further subdivided into multiple levels. These levels are called "phrase levels" herein. These phrase levels are highly predictive of whether a transition will occur.

A null transition is utilized for each phrase level to account for no change from one level to the next. The null transition enables a node to move to the next level without being altered. The null transition is assigned probabilities just like other transitions.

The parser 305 defines each node's syntactic history. Using the parser, phenomena that are predicative but appear elsewhere in the tree (other than simply a node's immediate decedents or ancestors) are included in the probability calculation.

The probabilities of the parser are conditioned on transition name, headword, phrase level, and syntactic history. Since the probabilities are conditioned on the transition name in the parser instead of just the structure of the rule (e.g. VP→NP VP), the parser may give the same structure different probabilities. In other words, there may be two transitions with the same structure that have different probabilities because their transition names are different. The probabilities of the exemplary SGM of the parser are computed top down. This allows for an efficient and elegant method for computing the goodness function.

A training corpus of approximately 30,000 sentences can be used to initially calculate the conditioned probabilities of factors such as transition name, headword, syntactic bigrams, phrase level, and syntactic history. The sentences in this training corpus have been annotated with ideal parse trees and the annotations contain all the linguistic phenomena on which the parser conditions.

The probabilities computation method has two phases: training and run-time. During the training phase, the system examines the training corpus, and pre-computes the probabilities (which may be represented as a "count") required at run-time. At run-time, the goodness function is quickly computed using these pre-computed probabilities (which may be "counts").

Conditioning on Headwords

Consider parse trees 590 and 592 shown in FIG. 15A. Assume the two parse trees are identical except for the transition that created the top-most VP (verb phrase). In Tree 590 of FIG. 15A, the verb phrase was created using the rule:

VPwNPr1: VP→VP NP

VPwNPr1 is used to add an object to a verb. For example, "John hit the ball" or "They elected the pope." In Tree 592 of FIG. 15A, the verb phrase was created using the rule:

VPwAVPr: VP→VP AVP

VPwAVPr is used when an adverbial phrase modifies a verb. For example, "He jumped high" or "I ran slowly."

To determine which tree was most probable using the conventional Transition Probability Approach (TPA), the number of occurrences of VPwNPr1 and VPwAVPr in the corpus is counted. If VPwNPr1 occurred most often, the conventional TPA's goodness function would rank Tree 590 of FIG. 15A. highest.

This may be correct, but often it will be wrong since it will choose Tree 590 of FIG. 15A regardless of the linguistic context in which the rules appear. For example, assume that the headword was "smiled". Parse trees 594 and 596 shown in FIG. 15B illustrate the same parses shown in trees 590 and 592 in FIG. 15A, but the headword "smiled" is noted. English-speaking humans know that Tree 594 of FIG. 15B is highly unlikely. "Smiled" is intransitive and cannot take a direct object. In other words, "She smiled the ball" is incorrect because someone cannot "smile" a "ball." Although, it is correct to say, "She smiled the most" because the "most" is not an object of "smiled." Although "the most" can act as a noun phrase in other contexts, it is an adverb in this case.

If the headword is included into the probability calculations, the goodness function is more likely to pick the correct parse. In particular, instead of just counting up all occurrences of VPwNPr1 and VPwAVPr in the corpus, a count is made of how often these rules appear with the headword "smiled." In doing so, it likely to be discovered that there are no instances of VPwNPr1 occurring with the headword "smiled." Thus, the goodness function would calculate the probability of Tree 594 to be zero.

Phrase Level

Phrases (e.g., noun phrases or verb phrases) have a natural structure. The job of the grammar (i.e., grammar rules) is to build this structure. Because of the rules of the language and because of conventions used by the grammarian, there are constraints on how the phrasal structure can be built. This translates into constraints on the order in which the rules can be applied. In other words, some rules must run before other rules. The exemplary SGM of parser 305 implements phrase levels to make this set of constraints explicit. Since phrase levels are predicative of what transition can occur at each node in a parse tree, incorporating them into the goodness function makes the goodness function more accurate.

To define the phrase levels for a given segtype, rules that create the given segtype are grouped into levels. All the rules at a given level modify the segtype in the same way (e.g., add modifiers to the left). The levels are numbered from one to N. Each level contains a null transition that allows a node to move to the next level without having an effect on the phrase being built.

The analysis grammar 315 build a phrase up by first producing an HWφ from a word. This is the head word of the phrase. It then enforces an order of levels by attaching modifiers of the headword in increasing phrase level order. For example, consider simple noun phrases in English. When building the parse tree for a noun phrase, the determiner (e.g., "the") is attached after the adjectives describing the noun. For example, "the red book" is correct, but "red the book" is not correct. Therefore, a rule that adds a determiner to a noun phrase must come after the rule(s) that add adjectives. Again, "after" is relevant to creation of a parse tree and the ordering of the application of the grammar rules. The term does not relate to the order of standard writing or reading.

For more complex noun phrases, the grammarian building a set of rules has some options. For example, consider the phrase: "The red toy with the loud siren." In one set of grammar rules, the structure may be like this:

(The (red (toy (with the loud siren))))

All prepositional phrases (e.g. "with the loud siren") are attached to noun first; adjectives are attached next, and finally the determiner ("the") is added last. Once a determiner is attached to a noun phrase, it is not possible to add additional adjectives or prepositional phrases. Another set of grammar rules might structure it this way:

((The (red toy)) (with the loud siren))

However, as long as a grammar 315 clearly defines the structure of noun phrases, there exist constraints on the order of the rules. In the parser's exemplary SGM, this ordering is made explicit by adding phrase level information to the rules and conditioning our probabilities on these phrase levels.

As another example, consider the grammar shown in FIG. 16 that builds verb phrases. This grammar supports verbs, noun phrases, and adjective phrases, but it has been simplified and does not support a range of other valid linguistic phenomena like adverbs, infinitive clauses, prepositional phrases, and conjunctions. This grammar can parse simple verb phrases like those shown in the description column of FIG. 16 and complex phrases like:

"More surprising, we have all found useful the guidelines which were published last year"

Figure 17A:
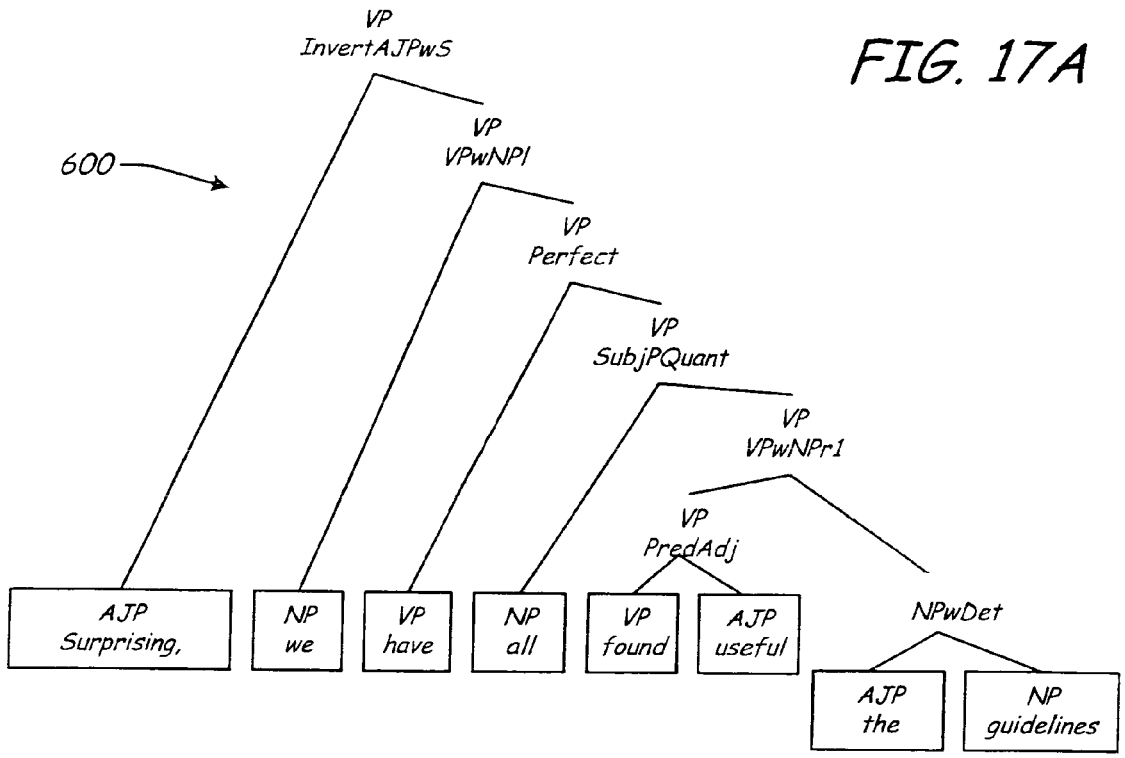
FIGS. 17A and 17B show fragments of two pairs of typical parse trees.

FIG. 17A shows a parse tree 600 representing a parse of the above sentence, where the parse is done in accordance with the example grammar provided above. To build complex verb phrases, this grammar enforces an ordering on the rules. First, VerbtoVP always runs to create the initial verb phrase. Then, post modifiers are added using PredAdj and/or VPwNPr1. Then "have" and quantifiers can be added. Next, the subject is added using SubjAJP or VPwNP1. Finally, topicalization and inverted AJP can be applied to phrases that have a subject. Constraints, such as those shown in the table of FIG. 18, are made explicit by adding the phrase level into the grammar rules.

As shown in the table of FIG. 18, on the right-hand side of each rule, each constituent is associated with a particular phrase level that is required for that constituent. Specifically, the number in parenthesis indicates the phrase level of the constituent (e.g., "VP(4)").

On the left-hand side of the rule, the phrase level of the resulting node is specified. For example, consider the null transition:

VP(4)→VP(3)

This null transition can be applied to a VP at phrase level three and create a VP at phrase level four.

"PL_Max" in a phrase level indicator means the highest phrase level that occurs for a given segtype. For example, for the grammar above VP (PL_Max) would be the same as VP(5). As another example:

VPwNP1: VP(4)→NP(PL_Max)VP(3)

This means that the rule can be applied to an NP that is at the highest NP level and to a VP that is at level three. The result of running the rule is to create a VP at level four.

Sometimes the phrase level of a constituent of the same segtype is the resulting node and may be either at the phrase level of the resulting node of less than then phrase level of the resulting node. For example:

Perfect: VP(3)→VP(1) VP(2,3)

He melted.
He had melted.
He had been melted.

To see an example of null transitions, consider the phrase: "Surprising, we found useful the guidelines."

Notice that this phrase differs from the similar phrase used above in that ". . . we have all found useful" has been simplified to be ". . . we found useful . . . "

The rule VpwNul at transition null requires the seond constituent to have PL3. Because the constituent has PL2 we construct a null transition first.

Figure 17B:
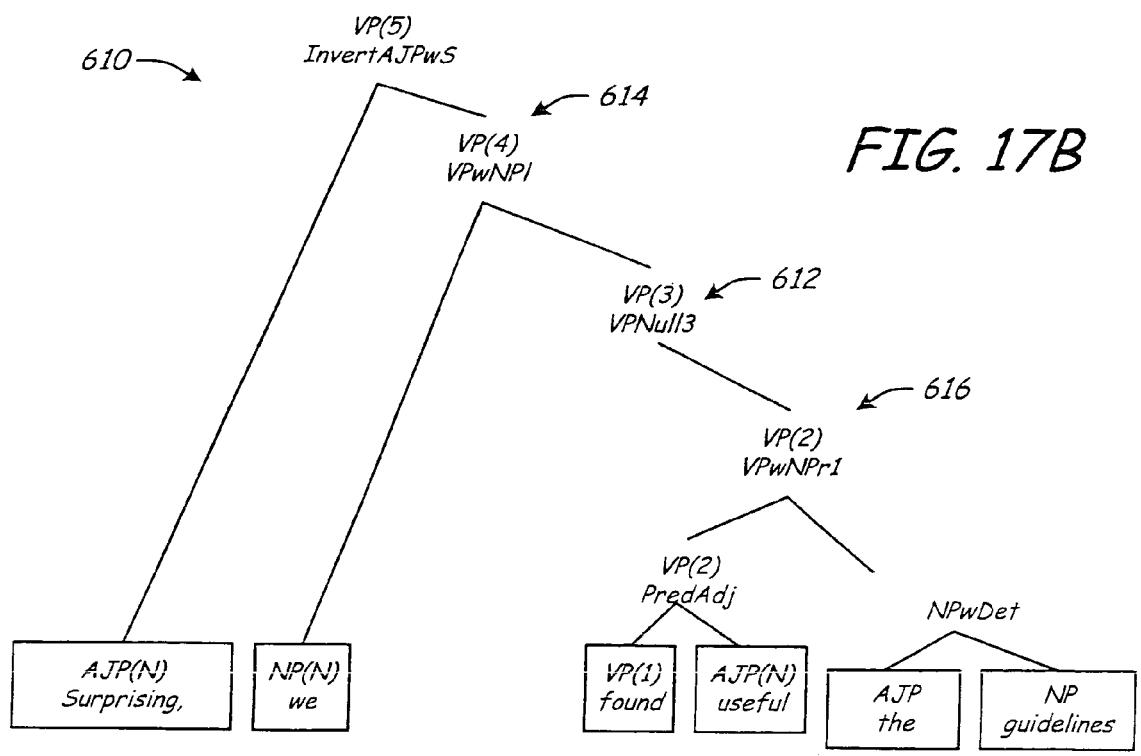

FIG. 17B shows a parse tree 610 representing a parse of this sentence. The null transition at 612 is used to move the VP(2) to be a VP(3). The null transition can be explicitly represented in the parse tree (as shown in FIG. 17B) or be implicit. It doesn't matter as long as it is taken into account in the computation of the probabilities of the exemplary parser. Conditioning on phrases levels means that any parse tree that violates the phrase level constraints can be eliminated (given probability equal to zero) by the exemplary parser.

The phrase levels and null transitions of the exemplary parser models the grammar of the English natural language. For example, consider the noun "nut." You would never see a sentence such as 'I want nut.' or 'Nut is on the table.' The word "nut" wants a determiner such as "a" or "the". The phrase levels and null transitions force the exemplary parser to explicitly consider the absence of modifiers, as well as their presence.

Syntactic History

A node's syntactic history is the relevant grammatical environment that a node finds itself in. It may include the history of transitions that occur above the node. For example, is the node below a NREL, PRPRT, PTPRT, RELCL, or AVPVP? It may include whether the node is in a passive or an active construction. It may include information that appears elsewhere in the tree. For example, whether the headword of a sibling node is singular or plural. The specifics of what it relevant is dependent upon the specifics of the grammar (i.e., rewrite rules or transitions) being used.

Figure 19:
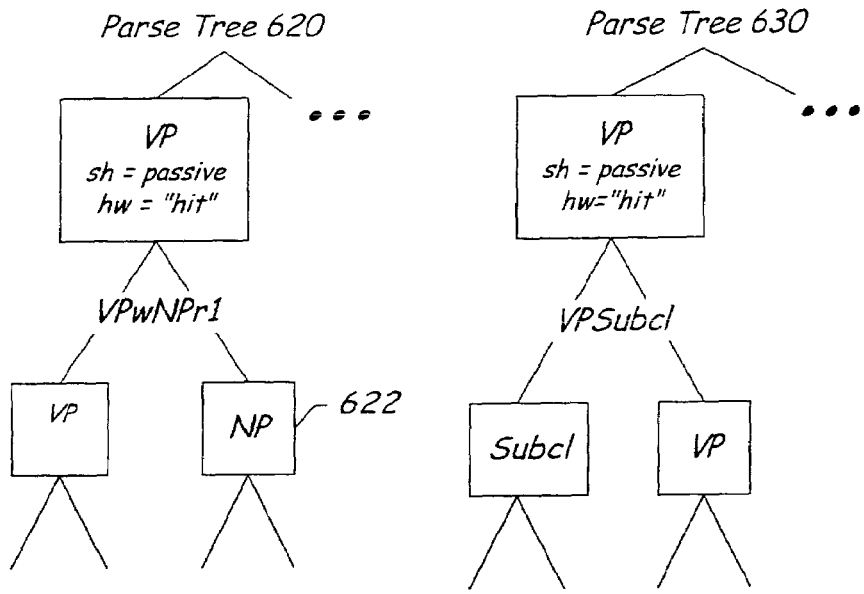
FIG. 19 shows fragments of a pair of typical parse trees and illustrates the use of syntactic history.

For example, FIG. 19 shows two parse trees, 620 and 630, for the same verb phrase. Both trees are parsing a verb phrase having the mono-transitive headword (hw="hit") and the verb phrase is known to be passive (sh=passive). In tree 620, the verb has a direct object as represented by NP at 622. In tree 630, the verb does not take a direct object.

In English, a mono-transitive verb inside a passive construction does not take a direct object. In contrast, when in the active form, the mono-transitive verb "hit" takes a direct object. For example, "I hit the ball" in the active form has a direct object "ball" to the verb "hit", but "the ball was hit" in the passive form has no direct object to "hit." English-speaking humans know that tree 620 will never occur. In other words, there is a zero probability of a mono-transitive verb (like "hit") taking a direct object when the sentence is passive.

In some embodiments of parser 305, the transition probabilities are conditioned on syntactic history as well as headwords. Using a training corpus, the exemplary parser counts up how often VPwNPr1 occurs in a passive construction with a mono-transitive verb and finds that it never occurs. Thus, the probability of tree 620 would be calculated to be zero.

Figure 20:
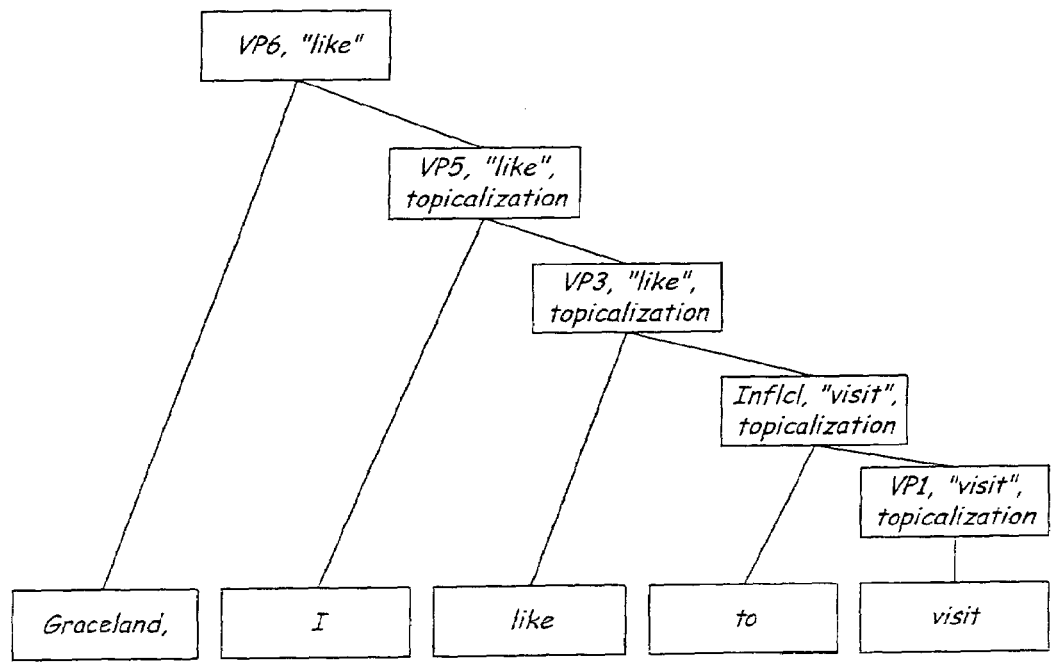
FIG. 20 shows a typical parse tree of a sample sentence, "Graceland, I like to visit," which illustrates the "topicalization" syntactic phenomenon.

Syntactic history can be propagated down many levels of the tree. Take, for example, the sample sentence, "Graceland, I love to visit." The thing ("Graceland") that "I" love to visit is stated before it is revealed the "I" loves to visit anything. FIG. 20 shows an annotated parse tree 640 of a parse of this sample sentence. As can be seen in FIG. 20, the "topicalization" feature is propagated past the verb "like" to the verb "visit." A complete discussion of syntactic phenomena which can be incorporated into syntactic history is not provided here, but the concepts of syntactic phenomena are well known by linguists.

SGM Probabilities

As noted previously, an exemplary SGM uses a generative grammar approach-each sentence has a top-down derivation consisting of a sequence of rule applications (transitions). For analysis, the probability of a parse tree is the product of the probabilities of all the nodes within that tree.

Generally, the probability of a node is defined as a conditional probability:

$$\text{Prob(node)}=\text{Prob(what\_is\_unknown|what\_is\_known)} \qquad \text{Formula 1}$$

Figure 21:
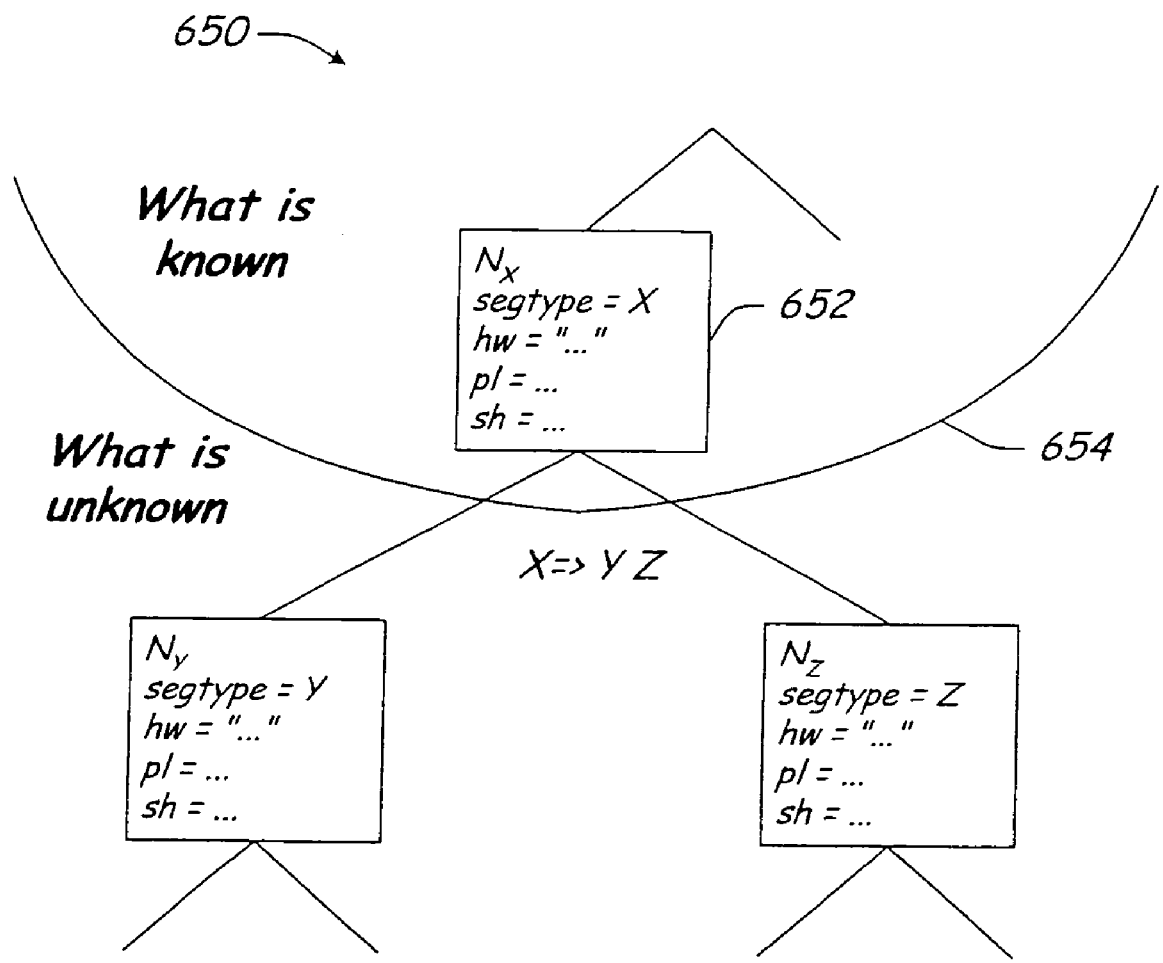
FIG. 21 shows a fragment of a genericized parse tree, illustrating what is known and not known at a node.

Assume that each node is visited in a depth-first tree walk. What is known is the information associated with the node and/or with any node previously encountered in the tree walk. For example, the properties of the node, it is headword, phrase level, syntactic history, and segtype. What is unknown is what occurs below the node (i.e., the transition taken and the properties of its children). FIG. 21 shows a portion of a parse tree 650 and visually illustrates what is known and unknown at a node 652. What is known is above line 654 because it has already been processed. Below line 654 is what is unknown because it has not been processed.

With reference to the parse tree 650 of FIG. 21, during analysis the conditional probability is:

$$\text{Prob(parse)}=\Pi_X\text{Prob}(n_X)=\Pi_X\text{Prob}(trn(n_X), hw(n_Y),$$
$$pl(n_Y), sh(n_Y), hw(n_Z), pl(n_Z), sh(n_Z)|hw(n_X),$$
$$pl(n_X), sh(n_X), \text{segtype}(n_X)) \qquad \text{Formula 2}$$

where $n_X$ ranges over all nodes in the tree and the transition named by $trn(n_X)$ is of the form X→Y Z or of the form X→Y.

To simplify Formula 2, it is noted that not all the parameters are independent. In particular, $trn(n_X)$ and $pl(n_X)$ imply $pl(n_Y)$ and $pl(n_Z)$. In other words, the name of the transition and the phrase level at node X implies the phrase levels of nodes Y and Z. Therefore, $pl(n_Y)$ and $pl(n_Z)$ may be removed from the left-hand side of the formula:

$$=\Pi_X\text{Prob}(trn(n_X) hw(n_Y), sh(n_Y), hw(n_Z), sh(n_Z)|hw$$
$$(n_X), pl(n_X), sh(n_X), \text{segtype}(n_X)) \qquad \text{Formula 3}$$

Similarly, Formula 3 may be simplified because $trn(n_X)$, $hw(n_X)$, and $sh(n_X)$ imply $sh(n_Y)$ and $sh(n_Z)$. In other words, the name of the transition, the headword, and the syntactic history at node X implies the syntactic history of nodes Y and Z. Therefore, $sh(n_Y)$ and $sh(n_Z)$ may be removed from the left-hand side of the formula:

$$=\Pi_X\text{Prob}(trn(n_X), hw(n_Y), hw(n_Z)|hw(n_X), pl(n_X), sh(n_X), segtype(n_X)) \quad \text{Formula 4}$$

Formula 4 may be further simplified. Tracking both $hw(n_Y)$ and $hw(n_Z)$ is not particularly valuable because one of them is the same as $hw(n_X)$. The one that is not the same is the modifying headword. The notation $modhw(n_X)$ to refer to this modifying headword. This yields:

$$=\Pi_X\text{Prob}(trn(n_X), modhw(n_X)|hw(n_X), pl(n_X), sh(n_X), segtype(n_X)) \quad \text{Formula 5}$$

Formula 5 may be simplified still further by applying the chain rule (as understood by those skilled in the art of statistics), yields this:

$$=\Pi_X\text{Prob}(trn(n_X)|hw(n_X),pl(n_X),sh(n_X),segtype(n_X))$$
$$*\text{Prob}(modhw(n_X)|trn(n_X),hw(n_X),pl(n_X),sh(n_X),segtype(n_X)) \quad \text{Formula 6}$$

Since $trn(n_X)$ implies $pl(n_X)$ and $segtype(n_X)$, the Formula 6 can further simplify this to be:

$$=\Pi_X\text{Prob}(trn(n_X)|hw(n_X), pl(n_X), sh(n_X), segtype(n_X))$$
$$*\text{Prob}(modhw(n_X)|trn(n_X), hw(n_X), sh(n_X)) \quad \text{Formula 7}$$

Finally, since it has been found that $sh(n_X)$ is not very predicative of what the modifying headword will be, Formula 7 can be approximated by removing $sh(n_X)$ from that part of Formula 7:

$$\cong\Pi_X\text{Prob}(trn(n_X)|hw(n_X), pl(n_X), sh(n_X), segtype(n_X))$$
$$\text{Prob}(modhw(n_X)|trn(n_X), hw(n_X)) \quad \text{Formula 8}$$
$$\text{(SGM for a parse)}$$

Notice that Formula 8 above is Formula B recited near the beginning of this detailed description.

PredParamRule Probability and SynBigram Probability

As described above, the probability of a parse tree is the products of the probabilities of each node. The probability of each node is the product of two probabilities. Thus, the SGM probability formula for a single node in a tree may be rewritten like this:

$$\text{Prob}(trn(n_X)|hw(n_X), pl(n_X), sh(n_X), segtype(n_X))$$
$$\text{Prob}(modhw(n_X)|trn(n_X), hw(n_X)) \quad \text{Formula 9}$$
$$\text{(SGM probability at a given node X)}$$

where X ranges over all the nodes in the parse tree.

This represents the statistical goodness measure-(SGM) of the exemplary parser. This may be divided into to two parts. For convenience, the first probability will be called the predictive-parameter-and-rule probability or simply "PredParamRule Probability" and the second probability will be called the "SynBigram Probability".

The PredParamRule Probability is:

$$\text{Prob}(trn(n_X)|hw(n_X), pl(n_X), sh(n_X), segtype(n_X)) \quad \text{Formula 10}$$
$$\text{(PredParamRule Probability)}$$

Unlike the Simple Content Dependent Approach (described above in the background section), the PredParamRule Probability conditions upon headword, segtype, phrase level, and syntactic history. Since these are highly predicative of the contextually correct parse, this PredParamRule Probability is a significantly more accurate goodness function than conventional techniques.

The SynBigram Probability is:

$$\text{Prob}(modhw(n_X)|trn(n_X), hw(n_X)) \quad \text{Formula 11}$$
$$\text{(SynBigram Probability)}$$

The SynBigram Probability computes the probability of a syntactic bigram. Syntactic bigrams are two-word collocation. The probability a measure of the "strength" of the likelihood of a pair of words appearing together in a syntactic relationship. For example, the object of the verb "drink" is more-likely to be "coffee" or "water" than "house".

As described above in the background section, this is a conventional technique to calculate a goodness measure. However, with existing conventional syntactic bigram approaches, it is used alone to calculate the goodness function and it requires a huge training corpus. The parser overcomes the limitations of conventional syntactic bigram approaches by further conditioning the goodness measure on independent probability characteristics. In particular, those characteristics are represented by the PredParamRule Probability formula (Formula 10).

As a review, the following is a known about calculating conditional probabilities by counting appearances in a training corpus:

$$\text{Prob}(x \mid y) = \frac{\text{Prob}(x \ \& \ y)}{\text{Prob}(y)}$$
$$= \frac{\text{Count}(x \ \& \ y)}{\text{Count}(y)}$$

Therefore, the PredParamRule Probability and the SynBigram Probability can be calculated by counting the appearances of relevant events in the training corpus. The probabilities of a given training corpus that are determined by the PredParamRule Probability and the SynBigram Probability may be generally called "language-usage probabilities" for that given training corpus.

Thus, the PredParamRule Probability formula (Formula 10) may be calculated as follows:

$$PredParamRule \text{ Probability} = Prob(trn(n_X) \mid hw(n_X), \quad \text{Formula 12}$$
$$pl(n_X), sh(n_X), segtype(n_X))$$
$$= \frac{\text{Count}(trn(n_X) \ \& \ hw(n_X) \ \& \ pl(n_X) \ \& \ sh(n_X) \ \& \ segtype(n_X))}{\text{Count}(hw(n_X) \ \& \ pl(n_X) \ \& \ sh(n_X) \ \& \ segtype(n_X))}$$

Moreover, the SynBigram Probability formula (Formula 11) may be calculated as follows:

$$SynBigram \text{ Probability} = Prob(modhw(n_X) \mid trn(n_X), hw(n_X)) \quad \text{Formula 13}$$
$$= \frac{\text{Count}(modhw(n_X) \ \& \ trn(n_X) \ \& \ hw(n_X))}{\text{Count}(trn(n_X) \ \& \ hw(n_X))}$$

Two Phases of SGM Calculation

Typically, a parser 305 (FIG. 3) of an NLP system is designed to quickly calculate the goodness measure for many parse trees of parses of a phrase. To accomplish this, the exemplary parser is implemented in two phases: "training" and "run-time."

During the training phase, the exemplary parser pre-calculates the counts that are needed to compute the PredParamRule Probability and the SynBigram Probability at run-time. Although this process tends to be time-consuming, processor-intensive, and resource-intensive, it only need be once for a given training corpus.

The result of the training phase is a set of counts for headword, phrase level, syntactic history, and segtype. If the training corpus approximates the natural language usage of a given purpose (general, specific, or customized), then the counts also approximate the natural language usage for the same purpose.

At run-time, these pre-calculated counts are used to quickly determine the probability of the parse tree. Each phrase is parsed into multiple parse trees. Each parse tree is given a SGM based upon the pre-calculated counts.

Alternatively, the training and run-time phase may be performed nearly concurrently. The training phase may be performer on a training corpus (or some subset of such corpus) just before the run-time phase is performed. Those who are skilled in the art will understand that time and space trade-offs may be made to accommodate the given situation. Regardless, the training phase (or some portion thereof) is performed, at least momentarily, before the run-time phase. This is because the training phase provides the foundation for the run-time phase to base its SGM calculations.

Although the present invention has been described with reference to particular embodiments, workers skilled in the art will recognize that changes may be made in form and detail without departing from the spirit and scope of the invention. For example, references to a string of text being stored or acted upon should be understood to include various representations, such as parse trees, of the string of text.

What is claimed is:

1. A method of generating a sentence from a semantic representation, the method comprising:
    (A) mapping the semantic representation to an unordered set of syntactic nodes;
    (B) using grammar rules from a generation grammar and statistical goodness measure values from a corresponding analysis grammar to create a tree structure to order the syntactic nodes, comprising:
        (B)(1) selecting a syntactic node to be the root node of a new syntactic tree:
        (B)(2) identifying generation grammar rules that apply to each leaf node in the tree, by testing rule conditions on semantically-derived attributes of the nodes;
        (B)(3) generating syntactic substructures described by each applicable rule and determining a statistical goodness measure value for each substructure; and
        (B)(4) selecting the substructure with the highest statistical goodness measure value to use to expand the tree, comprising:
            (B)(4)(i) discarding generated substructures that have lower statistical goodness measure values than substructures generated by alternative equivalent generation grammar rules at other phrase levels;
            (B)(4)(ii) adding the remaining substructure at the current phrase level with the highest statistical goodness measure value to the current syntactic tree; and
            (B)(4)(iii) if no substructures exist at the current phrase level, step down one phrase level and repeat method steps (B)(4)(i) and (B)(4)(ii); and
    (C) generating the sentence from the tree structure.

2. The method of claim 1, wherein step (B) of using grammar rules from the generation grammar further includes using a simplified form of the analysis grammar as the generation grammar.

3. The method of claim 2, wherein the analysis grammar includes lists of conditions for each grammar rule, and wherein using the simplified form of the analysis grammar as the generation grammar further comprises ignoring all conditions from the analysis grammar except those directly related to semantic representation.

4. The method of claim 3, wherein using the simplified form of the analysis grammar as the generation grammar further comprises using a context free form of a context sensitive analysis grammar as the generation grammar.

5. The method of claim 1, wherein step (B)(2) of identifying generation grammar rules that apply to each leaf node in the tree, by testing rule conditions on semantically-derived attributes of the nodes, further comprises:
    (B)(2)(i) identifying generation grammar rules that apply to the non-terminal leaf node at the current phrase level.

6. A computer-readable medium having computer executable instructions for performing the sentence generating steps comprising:
    (A) mapping a semantic representation to an unordered set of syntactic nodes;
    (B) using grammar rules from a generation grammar and statistical goodness measure values from a corresponding analysis grammar to create a tree structure to order the syntactic nodes, wherein the analysis grammar is a context sensitive analysis grammar, and wherein the generation grammar is a context free form of the context sensitive analysis grammar, wherein step (B) of using grammar rules from the generation grammar and statistical goodness measure values from the corresponding analysis grammar to create the tree structure to order the syntactic nodes further comprises:
        (B)(1) selecting a syntactic node to be the root node of a new syntactic tree;
        (B)(2) identifying generation grammar rules that apply to each leaf node in the tree, by testing rule conditions on semantically-derived attributes of the nodes;
        (B)(3) generating syntactic substructures described by each applicable rule and determining a statistical goodness measure value for each substructure; and
        (B)(4) selecting the substructure with the highest statistical goodness measure value to use to expand the tree, comprising:
            (B)(4)(i) discarding generated substructures that have lower statistical goodness measure values than substructures generated by alternative equivalent generation grammar rules at other phrase levels;
            (B)(4)(ii) adding the remaining substructure at the current phrase level with the highest statistical goodness measure value to the current syntactic tree; and
            (B)(4)(iii) if no substructures exist at the current phrase level, step down one phrase level and repeat method steps (B)(4)(i) and (B)(4)(ii); and
    (C) generating the sentence from the tree structure.

7. The computer-readable medium of claim 6, wherein step (B) of using grammar rules from the generation grammar further includes using a simplified form of the analysis grammar as the generation grammar.

8. The computer-readable medium of claim 7, wherein the analysis grammar includes lists of conditions for each grammar rule, and wherein using the simplified form of the analysis grammar as the generation grammar further comprises ignoring all conditions from the analysis grammar except those directly related to semantic representation.

9. A sentence generating system for generating a natural language sentence from an input semantic representation, the sentence generating system comprising:

a node mapper which maps the semantic representation to an unordered set of syntactic nodes;

a syntactic node orderer which uses grammar rules from a generation grammar and statistical goodness measure values from a corresponding analysis grammar to create a tree structure to order the syntactic nodes, wherein the generation grammar is a simplified form of the analysis grammar, wherein the analysis grammar includes lists of conditions for each grammar rule, and wherein the simplified form of the analysis grammar used by the syntactic node orderer as the generation grammar ignores all conditions from the analysis grammar except those directly related to semantic representation, wherein the syntactic node orderer creates the tree structure to order the syntactic nodes by performing the steps:

(1) selecting a syntactic node to be the root node of a new syntactic tree;

(2) identifying generation grammar rules that apply to each leaf node in the tree, by testing rule conditions on semantically-derived attributes of the nodes;

(3) generating syntactic substructures described by each applicable rule and determining a statistical goodness measure value for each substructure; and (4) selecting the substructure with the highest statistical goodness measure value to use to expand the tree, comprising:

(4)(i) discarding generated substructures that have lower statistical goodness measure values than substructures generated by alternative equivalent generation grammar rules at other phase levels;

(4)(ii) adding the remaining substructure at the current phase level with the highest statistical goodness measure value to the current syntactic tree; and (4)(iii) if no substructures exist at the current phase level, step down one phrase level and repeat steps (4)(i) and (4)(ii); and an inflection generator which produces an inflected form of leaf nodes in the tree structure and generates the sentence from the tree structure with the inflected form of the leaf nodes.

10. The sentence generating system of claim 9, wherein the generation grammar is a context free form of a context sensitive analysis grammar.

11. The sentence generating system of claim 9, wherein the syntactic node orderer creates the tree structure to order the syntactic nodes by repeating steps (2), (3) and (4).

12. The sentence generating system of claim 9, wherein step (2), performed by the syntactic node orderer, of identifying generation grammar rules that apply to each leaf node in the tree, by testing rule conditions on semantically-derived attributes of the nodes, further comprises: (2)(i) identifying generation grammar rules that apply to the non-terminal leaf node at the current phrase level.

* * * * *